(12) United States Patent
Kofford et al.

(10) Patent No.: US 12,023,220 B2
(45) Date of Patent: *Jul. 2, 2024

(54) OMNIDIRECTIONAL MULTI-UNIT ABUTMENT SYSTEM FOR SCREW-ATTACHED DENTAL PROSTHESES

(71) Applicant: Full Arch Solutions, LLC, Apex, NC (US)

(72) Inventors: Brandon Dale Kofford, Apex, NC (US); Charles Albert Rudisill, Apex, NC (US)

(73) Assignee: FULL ARCH SOLUTIONS, LLC, Apex, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/548,553

(22) PCT Filed: Jun. 3, 2022

(86) PCT No.: PCT/US2022/032234
§ 371 (c)(1),
(2) Date: Aug. 31, 2023

(87) PCT Pub. No.: WO2022/256699
PCT Pub. Date: Dec. 8, 2022

(65) Prior Publication Data
US 2024/0090982 A1    Mar. 21, 2024

Related U.S. Application Data

(60) Provisional application No. 63/196,227, filed on Jun. 3, 2021.

(51) Int. Cl.
*A61C 8/00* (2006.01)
*A61C 13/02* (2006.01)

(52) U.S. Cl.
CPC .......... *A61C 8/0053* (2013.01); *A61C 8/0022* (2013.01); *A61C 8/0068* (2013.01); *A61C 13/02* (2013.01)

(58) Field of Classification Search
CPC .... A61C 8/0022; A61C 8/0053; A61C 8/0068
See application file for complete search history.

(56) References Cited

U.S. PATENT DOCUMENTS

| 3,732,621 A | 5/1973 | Bostrom |
| 4,713,004 A | 12/1987 | Linkow et al. |

(Continued)

FOREIGN PATENT DOCUMENTS

| AT | 375012 B | 6/1984 |
| CN | 107280790 A | 10/2017 |

(Continued)

OTHER PUBLICATIONS

Buzayan et al., Passive Fil in Screw Retained Multi-unit Implant Prosthesis Understanding and Achieving: A Review of the Literature, J Indian Prosthodonl Soc (Jan.-Mar. 2014) 14(1):16-23.

(Continued)

*Primary Examiner* — Jacqueline T Johanas
*Assistant Examiner* — Drew S Folgmann
(74) *Attorney, Agent, or Firm* — Myers Bigel, P.A.

(57) ABSTRACT

A multi-unit abutment aligning a dental implant and a screw-attached prosthesis with copings is disclosed. The multi-unit abutment has a threaded base post for attachment to the implant and a ball portion. A swivel post into the implant with the multi-unit assembly in a linear configuration. The swivel shell is then positioned and fixed at a desired tilt and azimuthal angle. The swivel shell has a mating surface for a coping. The lock screw remains accessible through an aperture in the coping when the prosthesis is positioned on the implant abutments. Different embodi- (Continued)

ments are disclosed for capturing the swivel shell on the ball. Methods for improving passive alignment of the prosthesis to the implants are described.

17 Claims, 9 Drawing Sheets

(56) References Cited

U.S. PATENT DOCUMENTS

| | | | |
|---|---|---|---|
| 4,793,808 A | 12/1988 | Kirsch | |
| 4,832,601 A | 5/1989 | Linden | |
| 4,842,518 A | 6/1989 | Linkow et al. | |
| 4,907,969 A | 3/1990 | Ward | |
| 4,932,868 A | 6/1990 | Linkow et al. | |
| 4,988,297 A | 1/1991 | Lazzara et al. | |
| 5,133,662 A | 7/1992 | Metcalfe | |
| 5,178,539 A | 1/1993 | Peltier et al. | |
| 5,302,125 A | 4/1994 | Kownacki et al. | |
| 5,417,570 A | 5/1995 | Zuest et al. | |
| 5,564,922 A | 10/1996 | Rosa et al. | |
| 5,599,185 A | 2/1997 | Greenberg | |
| 6,287,115 B1 | 9/2001 | Lustig et al. | |
| 6,843,653 B2 | 1/2005 | Carlton | |
| 6,981,871 B2 | 1/2006 | Mullaly et al. | |
| 7,214,063 B2 | 5/2007 | Cohen | |
| 8,684,733 B2 | 4/2014 | McBride et al. | |
| 8,784,103 B2 | 7/2014 | Studer et al. | |
| 9,078,719 B2 | 7/2015 | McBride et al. | |
| 9,320,577 B1 | 4/2016 | Alotaibi et al. | |
| 9,452,029 B2 | 9/2016 | Mullaly et al. | |
| 9,452,030 B2 | 9/2016 | Allen et al. | |
| 9,474,587 B2 | 10/2016 | Wang | |
| 9,486,300 B2 | 11/2016 | Mullaly et al. | |
| 9,554,878 B2 | 1/2017 | Benzon | |
| 9,592,104 B2 | 3/2017 | McBride et al. | |
| 9,687,320 B2 | 6/2017 | Seavey | |
| 9,827,074 B2 | 11/2017 | Allen et al. | |
| 9,931,181 B2 | 4/2018 | Allen et al. | |
| 10,130,447 B2 | 11/2018 | Xam-Mar Mangrane | |
| 10,213,279 B2 | 2/2019 | Wang | |
| 10,265,144 B2 | 4/2019 | McBride et al. | |
| 10,507,085 B2 | 12/2019 | Elsner | |
| 10,842,597 B2 | 11/2020 | Allen et al. | |
| 11,045,288 B2 | 6/2021 | Xam-Mar Mangrane | |
| 2005/0042573 A1 | 2/2005 | Lustig et al. | |
| 2008/0261174 A1 | 10/2008 | Gittleman | |
| 2010/0151420 A1* | 6/2010 | Ranck .................. | A61C 8/0054 433/173 |
| 2010/0291507 A1 | 11/2010 | Abdelgany | |
| 2015/0313690 A1 | 11/2015 | Elsner | |
| 2017/0049540 A1 | 2/2017 | Mullaly | |
| 2018/0303586 A1 | 10/2018 | Jacobsen et al. | |
| 2019/0117345 A1 | 4/2019 | McBride et al. | |
| 2021/0038348 A1 | 2/2021 | Allen et al. | |
| 2022/0117703 A1 | 4/2022 | Gasparon et al. | |

FOREIGN PATENT DOCUMENTS

| | | |
|---|---|---|
| CN | 105916466 B | 11/2018 |
| DE | 9202656 U1 | 4/1992 |
| DE | 19653229 A1 | 6/1998 |
| DE | 19959366 A1 | 6/2001 |
| DE | 10133932 A1 | 1/2003 |
| EP | 0580945 A1 | 2/1994 |
| EP | 1547543 A1 | 6/2005 |
| EP | 2594225 B1 | 7/2018 |
| EP | 3831335 A1 | 6/2021 |
| EP | 3981359 A1 | 4/2022 |
| FR | 2727307 A1 | 5/1996 |
| IT | UD20110065 A1 | 10/2012 |
| KR | 101966407 B1 | 4/2019 |
| KR | 102034995 B1 | 10/2019 |
| WO | 9203984 A1 | 3/1992 |
| WO | 2014053850 A1 | 4/2014 |
| WO | 2016139671 A1 | 9/2016 |
| WO | 2018106027 A1 | 6/2018 |
| WO | 2020100106 A2 | 5/2020 |

OTHER PUBLICATIONS

Cavallaro et al., Angled implant abutments: A practical application of available knowledge Feb. 2011 Journal of the American Dental Association (1939) 142(2):150-8.
Hanif et al. Complications in implant dentistry, European Journal of Dentistry 2017; 11:135-40.
International Search Report/Opinion from USPTO on PCT/US22/32234 mailed Sep. 19, 2022.
Sahin et al., The Significance Of Passive Framework Fit In Implant Prosthodontics: Current Status, Implant Dentistry /vol. 10, No. 2 2001, 85-90.
Siamos et al. The Relationship Between Implant Preload and Screw Loosening on Implant-Supported Prostheses, J. Oral Implantology, 2002, 67-73. http://meridian.allenpress.com/joi/article-pdf/28/2/67/2032852/1548-1336(2002)028_0067_trbipa_2_3_co_2.pdf.
Svoboda, Dental Implant Prosthetics: Using a Modified Installation Technique, Oct. 18, 2016, downloaded from https://www.oralhealthgroup.com/features/dental-implant-prosthetics-using-modified-installation-technique/ on Dec. 3, 2022.
Elshenawy et al., "Cast accuracy obtained from different impression techniques at different implant angulations (in vitro study)", International Journal of Implant Dentistry, 2018; 4.
Goodacre et al., "Prosthetic complications with implant prostheses (2001-2017)", European Journal of Oral Implantology; 2018; 11(suppl1):S27-36.
Hess et al., "A technique to guide replacement of multi-unit abutments supporting an existing implant-supported fixed complete denture"; Journal of Prosthetic Dentistry, 2020, 124:3, p. 270-273. USA.
Lee et al. "Accuracy of five implant impression technique: effect of splinting materials and methods", J Adv Prosthodont 2011; 3:177-85, Korea.
Omuri et al., "Biological and mechanical complications of angulated abutments connected to fixed dental prostheses: A systematic review with meta-analysis"; 2020; Journal of Oral Rehabilitation, 47(1):101-111 USA.
Supplementary European Search Report corresponding to European Patent Application No. 22816962.9 (4 pages) (dated Jan. 15, 2024).

* cited by examiner

OMNIDIRECTIONAL MULTI-UNIT ABUTMENT SYSTEM FOR SCREW-ATTACHED DENTAL PROSTHESES

REFERENCE TO RELATED APPLICATIONS

This disclosure claims priority to US provisional patent application No. 63/196,227, filed on Jun. 3, 2021, which is incorporated herein by reference in its entirety.

BACKGROUND OF THE INVENTION

Different systems have been introduced for attaching dental prostheses to dental implants to replace one or more natural teeth. In order to simplify future modification or replacement needs, it is desirable to have reversable attachment between the implants and prostheses using mechanical systems as opposed to directly bonding these components together. These systems may include features to provide both proper alignment and retention for acceptable use by the patient. Intermediate components such as Ti bases (also called copings) and separable abutments are often employed to provide proper registration between a dental prosthesis, one or more implants embedded in the patient's jawbone, and the soft-tissue and any remaining natural teeth. These intermediate elements may be mutually attached with screws, ball-and-socket joints, snap-on mounts, cement or other mechanical means.

The simplicity of screw-attached systems provides some benefits over snap-on systems beyond fabrication cost. The mounting pressure between the coping and abutment is readily controlled through the torque applied to the screw to tighten it. This axial tension control and the self-aligning characteristics of engaged screw threads provides more certainty in the engagement force and relative orientation of the components. Even if a screw breaks, techniques are known for removing the pieces without damage to surrounding components. Screws also have a benefit of independence for removal since each coping can be loosened individually. Tilting the prosthesis after screw removal to disengage one coping cannot cause reengagement of another coping.

In the case of a single-tooth crown attachment, the Ti base and abutment surfaces preferably include features to remove rotational symmetry about the azimuthal axis in the mating of the abutment and coping surfaces. Rotational locking features may also be included in these single mount systems. When the prosthesis contains multiple copings for attachment to multiple abutments, this rotational fixation is not generally required. For example, 30 degree tapered mating surfaces for multiple interface locations are sufficient to provide complete registration. This form is illustrated in the drawings of this disclosure for convenience, but is not meant to be limiting.

The goal for all implant attached prostheses is to have a passive fit of the prosthesis superstructure to the implants to avoid stress on the prosthesis or on the osseointegration process of the implants. These stresses may cause problems during the initial loading or crop up much later. Misfit can lead to both mechanical and biological problems in single implant and multiple implant treatments. The mechanical problems may include loosening of prosthesis retaining and abutment screws and fracture of components including screws. Biological issues may include discomfort, progressive marginal bone loss, bacterial infection, microbial plaque buildup and implant loosening.

Having a passive fit initially or being able to readjust or rework components later to adapt to changes are important for successful prosthesis functionality and survival. Due to the build-up of tolerances and introduction of misalignments and distortions in producing a prosthesis, attaining a passive fit remains a challenge. The use of direct pick-up impression procedures is beneficial, but improvements are still needed. A review of passive fit challenges has been provided by Buzayan, M. M., & Yunus, N. B. (2014) "Passive Fit in Screw Retained Multi-unit Implant Prosthesis Understanding and Achieving: A Review of the Literature" *Journal of Indian Prosthodontic Society*, 14(1), 16-23 (https://doi.org/10.1007/s13191-013-0343-x.)

A treatment option for edentulous patients that is gaining popularity involves the placement of four to eight implants in the edentulous jaw and the mounting of a prothesis arch. A transmucosal abutment is fastened to the implant and intended to remain in place indefinitely. While it would be desirable to have the axes of all of the implants located parallel to one another, underlying bone structure often results in installing implants at an angle from this ideal mutual orientation. "Multi-unit abutment" is a popular descriptor for a specific type of transmucosal abutment used for the restoration of the edentulous jaw with a single prosthesis, that is a full arch prosthesis.

The multi-unit abutment (commonly referred to as an "MUA") is a fairly easy way to improve divergent angulations of implants with options of 0 degree, 17 degrees, and 30 degrees angulation corrections. Generally, 0 degree MUAs are easier to position because the abutment is positioned in line with the linear axis of the implant. The 17 and 30 degree MUAs typically include a "screw access" indicator that is relatively long and difficult to work around in tight spaces, such as the posterior of the jaw where these abutments are commonly positioned to compensate for the disto-angulation of the posterior implants popularized by Dr Paolo Maolo in 2004.

There have been several alternative abutment designs for the restoration of the edentulous arch. Although most implant companies have settled on the MUA geometry adopted by Nobel Biocare, there have been some attempts to improve on the weaknesses of that geometry. For example, Dentsply Implants Astra EV system uses a "mulTi base" abutment that improves on the lack of coverage of the prosthetic screw in the multi-unit abutment. Neoss uses a version of the MUA that "reduces the height of the abutment" by using a female connection as opposed to the standard male connection of the MUA. Regardless of the benefits of these improved designs, each design requires the clinician to order a specific stock of specific angulation corrections and heights. An example of the complexity of the inventory management is when the implant system offers multiple implant/abutment connections (e.g., narrow platform and regular platform) and multiple heights to the MUAs (e.g., 1.5 mm, 2.5 mm, 3.5 mm, 4.5 mm, etc.) as well as different angulations or tilt angles (e.g., 0 degree, 17 degrees, and 30 degrees). To maintain sufficient stock to be well-prepared for a full arch implant fixed immediate load procedure could require having the three tilt angle options multiplied by the number of platform options multiplied by the number of reasonable tissue heights for the amount of implants expected to be placed (a minimum of four according to Paolo Maolo's protocol).

The resulting inventory equation follows:

3 (degree options)×2 (platform connections)×2 (different tissue heights)×4 (implants)=48 (multi-unit abutments).

This inventory problem is increased when multi-unit abutment systems also require unique implants, Ti bases and prosthetic fasteners. This inventory management complexity is further exacerbated when practitioners prefer different vendor systems under different patient circumstances, or when different practitioners in a practice prefer different vendor offerings.

In addition to the complexity of the inventory management, there is also a limitation to the discrete nature of the "angulation correction" (for example, limited to three specific angles 0, 17 and 30) and the internal connection of the implant about its longitudinal axis that may be referred to as an azimuthal angle. In many cases an internal hex limits the possibilities to 6 azimuth positions with 60 degrees of variation from one position to the next. In some cases, 0 degrees would be too little tilt angle correction, but 17 degrees is excessive. The same would hold true for 17 to 30. Or 17 degrees may be an appropriate tilt correction, but due to the limitation of the 6 positions in the internal hex, the 17 degrees of correction required cannot be applied in the ideal azimuthal direction of correction needed. The same holds true for 30-degree correction. Novice clinicians to full arch implant treatment struggle with the selection and positioning of multi-unit abutments. Procedure times are extended which can cause increased morbidity to the patient.

Although there is uncertainty over whether angled implants are more susceptible to loss of osseointegration than straight abutments, all implants do impart higher mechanical stress and strain on bone structures than natural teeth. Natural teeth can move an order of magnitude more in their sockets than an implant embedded in bone. This natural shock absorber helps cushion the range of force magnitudes and directions applied to the teeth from the bone. Screw loosening has been associated with bending of the screw joint and settling effects in which initial surface microroughness keeps joined parts initially separated, but high spots are gradually worn down. Microgaps from initial mechanical misfit between elements in the prosthesis superstructure may be too small for detecting with an explorer, yet large enough to concentrate mechanical forces coming from different directions at different magnitudes in the process of mastication. These microgaps may still be large compared to bacteria that can penetrate and grow in internal cavities of the overall dental prosthesis superstructure installation.

Due to the large range of variables, application specifics and difficulty of in situ measurements, there is not an accepted passive fit threshold for long-term success. The quality of fit may be tested in the dental laboratory with analogs and at installation in the patient, but this is not an exacting science. For example, a "one screw test" for fit involves tightening only one screw at one end of the prosthesis and then looking for lift at the opposing end. A "screw resistance test" variant of this involves inserting and seating screws in sequence and then seeing if any needs to be turned more than 180 degrees to achieve say 10 Ncm of torque. Failure of the prescribed go-no go test criterion means that the prosthesis needs to be reworked or replaced. Since the same process will be used to fabricate the replacement, there is not certainty that this replacement will be properly aligned.

Even if all of the multi-unit abutments are perfectly aligned and secured initially with the implants and prosthesis, changes may occur over time. For example, the prothesis may deform, or the bone structure may change, or perhaps more likely a fastener becomes loose or breaks. In many prior art systems, the prosthesis must be completely removed to try to adjust the orientation, retighten a multi-unit abutment fastener, replace a component or perhaps even fabricate and fit a whole new prosthesis. Inefficient trial and error fitting cycles to improve alignment are frustrating to both the patient and dental practitioner. Replacing a single failed multi-unit abutment out of several and properly aligning it with an existing prosthesis may be even more difficult than the initial installation alignment. There is a need for a way to provide adjustments to the orientation of a multi-unit abutment orientation while the prosthesis is in place.

Some commercial systems require the sequential assembly of the multi-unit abutment elements in situ during their installation in the patient's mouth. This increases the chance of the patient accidentally swallowing components. Some systems require multiple tools to be employed which can also extend procedure complexity and times.

To address one or more of the above challenges and limitations of the current multi-unit abutments available on the market, new multi-unit abutment embodiments are disclosed herein. These units are designated as omnidirectional in the sense of being able to be positioned over a continuous range of orientations sufficient for correcting implant angulation differences typically found in general practice. Although the discussion above was based on structural reasons, angled implants may also be preferred simply for aesthetic reasons, for example, to reorient screw access holes in single tooth crowns. Embodiments of omnidirectional multi-unit abutments are offered that have advantages in inventory management, placement procedures, options for angulation correction and flexibility, improving passive fit and to remove limitations to angle corrections or other issues with existing multi-unit abutment systems for single implant crowns and multiple implant prostheses.

SUMMARY OF THE INVENTION

Some embodiments of the invention include a multi-unit abutment for screw attachment to a dental implant which allows seating of Ti bases at a user-selected rotation and tilt angle relative to the implant. This seating orientation can be fixed prior to bonding the Ti base to the prosthesis, and in some embodiments can be adjusted or tightened by removing the prothesis retention screw while the Ti base is otherwise held onto the abutment. In this manner, the final relative orientation of the adjustable abutment can be directly influenced by the fixed position of the Ti bases in the prosthesis. This can correct or reduce misalignments resulting from the accumulation of positioning errors in steps of the fabrication of the prosthesis relative to the initial position of the abutments.

Some embodiments of the invention include a multi-unit abutment that is assembled outside of the patient's mouth, mounted onto a drive tool in a linear arrangement for attaching it to an implant, reorienting the abutment portion that interfaces with a Ti base that is not aligned with the axis of the implant, and then fixing the orientation. Subsequently a Ti base can be attached to the multi-unit abutment with a prosthetic screw.

Some embodiments of the invention allow a single drive tool to screw the multi-unit abutment into an implant and to lock the orientation of the abutment surface. Other embodiments use different drive tools for these processes.

Some embodiments of the invention include a ball portion and a swivel portion that are capable of relative tilt or rotation, but are constrained to not separate from one another. Some embodiments allow the relative orientation of the ball and swivel to be fixed by applying pressure on opposite sides of the ball portion. Some embodiments of the invention include a locking screw attached to a swivel portion to apply pressure on opposite sides of the ball. In some embodiments, the multi-unit abutment can be installed in the implant by passing a drive tool through an aperture of the locking screw. In some embodiments of the invention, the locking screw includes threads for the prosthetic screw. In some embodiments, the locking screw can be accessed through the Ti base fixed to a prosthesis.

One embodiment describes a system for alignment and attachment of a dental prosthesis to an implant with a prosthetic screw, wherein the prosthetic screw comprises a head and a threaded shaft, the system comprising:
  an abutment base having a longitudinal axis, the abutment base comprising
  a proximal end comprising a ball portion and an abutment base drive interface; and
  a distal end comprising screw threads for attachment to the implant; and
  a swivel shell having an inner surface and an outer surface, wherein the swivel shell includes a swivel aperture proximate the distal end and a threaded aperture at the proximal end; and
  a lock screw having a longitudinal axis, wherein the lock screw comprises
    a portion with external threads compatible with the threaded aperture of the swivel shell; and
    a portion with internal threads sized to engage the prosthetic screw shaft; and
    a lock screw drive interface; and wherein rotating the lock screw is capable of fixing the orientation of the longitudinal axis of the lock screw in an orientation that is not parallel to the longitudinal axis of the abutment base.

One embodiment describes how the omnidirectional multi-unit abutment can be used in a method comprising:
  attaching the lock screw to the swivel shell around the abutment base with the ball portion loosely constrained inside the swivel shell with the abutment base screw threads extending through the swivel aperture to form a multi-unit abutment assembly;
  inserting the abutment drive tool tip through the lock screw to engage the abutment base drive interface;
  presenting the abutment base drive tool and multi-unit abutment assembly to the implant;
  rotating the abutment base drive tool to attach the abutment base to the implant to a first torque;
  disengaging the abutment base drive tool from the abutment base drive interface;
  moving the swivel shell to a different orientation;
  rotating the lock screw drive tool to fix the orientation of the swivel shell axis relative to the implant axis to a second torque;
  presenting a prosthesis comprising a Ti base to the implant abutment system; and
  attaching the prosthesis to the implant abutment with a prosthetic screw.

Some embodiments describe a system for alignment and attachment of a dental prosthesis to an implant using a multi-unit implant abutment, the multi-unit implant abutment comprising:
  a ball and shell assembly comprising:
  a base comprising an abutment drive interface for screw attachment to the implant;
  the base comprising a first end having a ball and a second end with a threaded post with a longitudinal axis; and wherein the threaded post is designed to screw into a dental implant to a predetermined torque;
  a shell portion having an interior surface and an exterior surface; wherein the shell portion has a first end with an aperture and a second end has a lock screw; and
  wherein the ball is captured inside the shell portion with the threaded portion of the base post extending through the aperture;
  a Ti base comprising an aperture on the proximal end and an interface on the distal end designed to mount on the exterior of the shell portion in a known position; and
  one or more drive tools designed to engage the abutment drive interface and the lock screw; wherein at least one drive tool is capable of being inserted through the Ti base aperture to engage the lock screw; and wherein tightening the lock screw applies pressure on the ball to fix the orientation of the shell.

For the purposes of this disclosure, a dental prosthesis is defined broadly to be anything that incorporates one or more dental copings or Ti bases that can be mounted and removed from one or more implant abutments. Different Ti base designs are known in the dental industry, and the systems and methods disclosed here can be adapted to work with many commercially available types of Ti bases including pick-up copings, temporary cylinders, inserts and impression copings. Implant abutments are known in the dental industry having compatible interfaces to these Ti bases. Since the mechanical interface is the same, for the purposes of this disclosure, implant abutment is considered a generic term that includes abutment analogs. Description of abutment alignment systems and process methods with Ti bases and implants that are installed in a patient's jaw should be considered to also describe equivalent inventive concepts that may be used with Ti bases and implant analogs in a dental lab. A common geometry comprises a conical Ti base seated to a conical implant abutment. Although this form of system is used in the figures and discussion below, the inventive concepts may also be applied to other types of Ti bases and abutments.

The inventive concepts disclosed herein can be used with different types of dental prostheses. The dental prosthesis can be any form of impression used in a dental lab to assist in creating and testing dental prostheses. A dental prosthesis can also be one fabricated in the dental lab using a physical model made from the impression, a dental prosthesis newly fabricated, or an existing prosthesis being converted for screw attachment. A dental prosthesis is defined to include a single-tooth appliance such as a crown, or any multiple-tooth bridge or denture. These prostheses may incorporate Ti bases to provide a separable interface to provide orientation with an appropriate abutment attached to a patient's jaw or gingiva. Although the name implies applications with multiple implants, multi-unit abutments may also be used individually to provide mounting to an implant for single tooth prostheses. As a result, the term multi-unit abutment will be used herein whether for single implant or multiple implant applications and for any form of dental prosthesis. The multi-unit abutments for use with the inventive concepts disclosed herein include screw threads to mount the prosthesis with Ti bases onto the abutments and the abutments into the implants. While the concepts describe the typical male threads in the multi-unit abutment mating with female threads on the implant, this is for convenience in disclosure. Unless explicitly stated or restricted by functional necessity, some inventive concepts may be applied with systems having female threads in the multi-unit abutment engaging a screw with male threads in an implant. These are considered to be straightforward variations of the inventive concepts. One benefit of preferring the typical female threading of the implant for abutment attachment is standardization and implementation flexibility. For the same reasons, prosthetic screws with male threads and commercially available Ti bases are preferred, but may not be required to gain some benefit from inventive concepts disclosed. These types of variations are considered to be within the scope of this disclosure.

The systems and methods disclosed herein can be used with prostheses for attachment to implants in both the upper and lower jaw. As a result, portions of the system that are oriented downward for the lower jaw will be oriented upward for the upper jaw and vice versa. For convenience, a disclosure of an embodiment of inventive concepts that is limited to a single jaw orientation, is considered to disclose an embodiment for the opposite jaw orientation. When referring to the perspective of a clinician, proximal portions are nearer to the clinician than distal portions. While a term such as top is the opposite of the term bottom, and proximal is the opposite of distal, their actual relative orientation will be determined by the context of their use. The term tissue-side is used interchangeably with intaglio to indicate the side of a prosthesis that is opposite the occlusal or cameo surface.

The inventive systems disclosed are beneficially applicable to screw-attached prostheses and abutments. Key benefits of screw-attachment are variable tightening torques and reversibility. The terms permanent, semi-permanent, definitive and final when referring to screw-attachment are used interchangeably in this disclosure. A conventional screw that is definitively attached can still be removed by accessing the screw and rotating it in the opposite direction that was used for attachment. For the purposes of screw-attached prostheses for this disclosure, the attachment is semi-permanent, permanent or definitive in the sense that frequent attachment and removal is not anticipated for normal use. In contrast, a temporary screw attachment is applied for a planned process duration or other anticipated interval. The positioning of the Ti bases in the dental prosthesis may be effectively performed with a lift-off process using the temporary screws disclosed in co-owned U.S. Pat. No. 11,311,354, which is herein incorporated by reference in its entirety. However, the utility of inventive concepts in this disclosure are not dependent upon using the system or methods disclosed in the referenced patent.

Screw attachment of an abutment to an implant is also described in the embodiments. However, some of the disclosed concepts may readily be adapted to other systems that do not utilize screw attachment of dental components to an implant such as snap-on or magnetic systems. These modifications are considered to be obvious variations of the inventive concepts described in the current disclosure.

Removal of a semi-permanent or definitive screw is generally motivated by a problem or an opportunity for an improvement. Access to the screw to apply a tool for removal may require removal of material covering the screw that was added for aesthetic reasons. Some embodiments provide for adjusting the orientation of the multi-unit abutment when the prosthesis is positioned on the multi-unit abutment without a semi-permanent or definitive screw in place. This may to improve passive fit of the prosthesis to implants when initially installed or after the system has been used for an extended period of time. While the implant abutments are generally used initially to position the Ti bases in the prosthesis, individual alignment errors will necessarily accumulate during subsequent processing or over time. The apparatus and methods disclosed below allow the set of Ti bases in the prosthesis to be used for fine tuning the alignment of the multi-unit abutments to the set of Ti bases improve the overall passive fit.

Elements disclosed herein may be characterized as having an axis or a longitudinal axis. In the case of a long cylindrical object like a pencil, the longitudinal axis is unambiguously through the center of the cylinder from the writing end to the eraser end of the pencil. The longitudinal axis is traditionally considered to be along the length or longest dimension of an object characterized by length, width and thickness in descending dimensional magnitude. If instead of a pencil, a threaded bolt is considered, the axis or even longitudinal axis may be considered to be through the center from the engaging end of the threads through the center of the head of the bolt. The rotational axis in this case and the longitudinal axis are the same even for stubby bolts. In this disclosure, the axis or longitudinal axis of an object with screw threads will be the same as the rotational axis of the threading. Widths will be measured perpendicular to this rotational axis. Thus, a traditional nut with interior threads would be considered to have a longitudinal axis through the middle of the central aperture, i.e., where the matching bolt's axis would be located when engaged. By extension, a washer without threads captured between a bolt and a nut would also be considered to have a longitudinal axis or simply an axis centered in the aperture and perpendicular to the plane of the washer. For the purposes of this disclosure, a linear assembly of components results from having the component axes of the assembly in a roughly colinear arrangement. Thus, an assembly comprising a bolt with a washer and nut would be a linear assembly even if the axis of the washer can move around the shared axes of the bolt and nut due to the washer aperture being larger than the width of the threaded section of the bolt. External threading is generally characterized as having a minor diameter measured at the root of the threads and a major diameter measured at the crest of the threads. Internal threading is generally characterized as having a minor diameter at the crests and a major diameter at the roots. Unless otherwise specified, the width of the external threads on a bolt stem is defined to be the major diameter or maximum deviation from the bolt's axis, that is, what would be measured with calipers. The width of the internal threads of a nut is defined to be the minor diameter of the internal threads or minimum deviation from axis of the nut, that is, what could be measured with a pin or plug gauge.

In this disclosure some threaded elements that tighten by relative rotation may have some characteristics that could be considered nut-like and others that are screw-like, such as elements having both female and male threading. The term screw will be used generically in this disclosure for these threaded elements in discussing the inventive concepts. However, external threading on a screw will be considered to be male and internal threading will be considered to be female.

For the purposes of this disclosure, the term ball means a mechanical structure that includes some geometric attributes of a sphere. It is a more generic term that allows for only some portions of the surface of the ball having essentially spherical surfaces while other portions can deviate significantly from having spherical surfaces. Spherical surfaces are preferred for some of the orientational flexibility and sealing of the contact surfaces between a ball and a structure that can be repositioned and locked in position relative to the ball perhaps by swiveling. A shell is something that at least partially surrounds a ball. Contacting surfaces between the exterior of a ball and the interior of a shell are preferably spherical surface segments of about the same diameter for increased frictional grip when starting the fixing process or for providing a sealing surface to block the interior of the assembly from biological contamination. While having the flexibility to position the axis of a prosthetic screw and Ti base without restriction at an angle of 30 degrees with respect to the axis of an implant and at any rotation angle around either axis may be preferred, mating elements of the implant, ball, shell or Ti base may be designed to restrict this omnidirectional angular flexibility. Such restrictive modifications are known in the art and may be used with some inventive concepts disclosed here.

It is common in prosthodontics to secure threaded elements to a desired torque or to have some elements fastened to a higher or lower torque than some other combination of elements. For example, if three elements are screwed together in sequence, it is common to prefer that the first two are assembled with a higher torque so that the third element can be attached or removed without affecting the attachment of the first two. In some cases, torques are quantified with torque wrenches and sometimes the experience of the practitioner is used to determine when the torque is sufficient for functioning as desired. For the purposes of this disclosure, these torques will be considered to be predefined whether assessed in a quantitative or a qualitative manner. If a quantitative minimum torque value or acceptable range is specified to be essential, measurement with a tool or with some indication structure built into the parts is expected. In some embodiments, it may be desirable to prevent excessive torquing that could cause structural or biological stress on the implant seating or prosthesis through controlled failure of sacrificial elements. This controlled mechanical failure may result from both intentionally weakened structures or characterization of inherent failure characteristics of uniform structures.

Other terms in the specification and claims of this application should be interpreted using generally accepted, common meanings qualified by any contextual language where they are used. The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "about" and "essentially" mean±10 percent. Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation. The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting. Other objects, features, embodiments and/or advantages of the invention will be apparent from the following specification taken in conjunction with the following drawings.

DETAILED DESCRIPTION OF THE INVENTION

Figure 1:
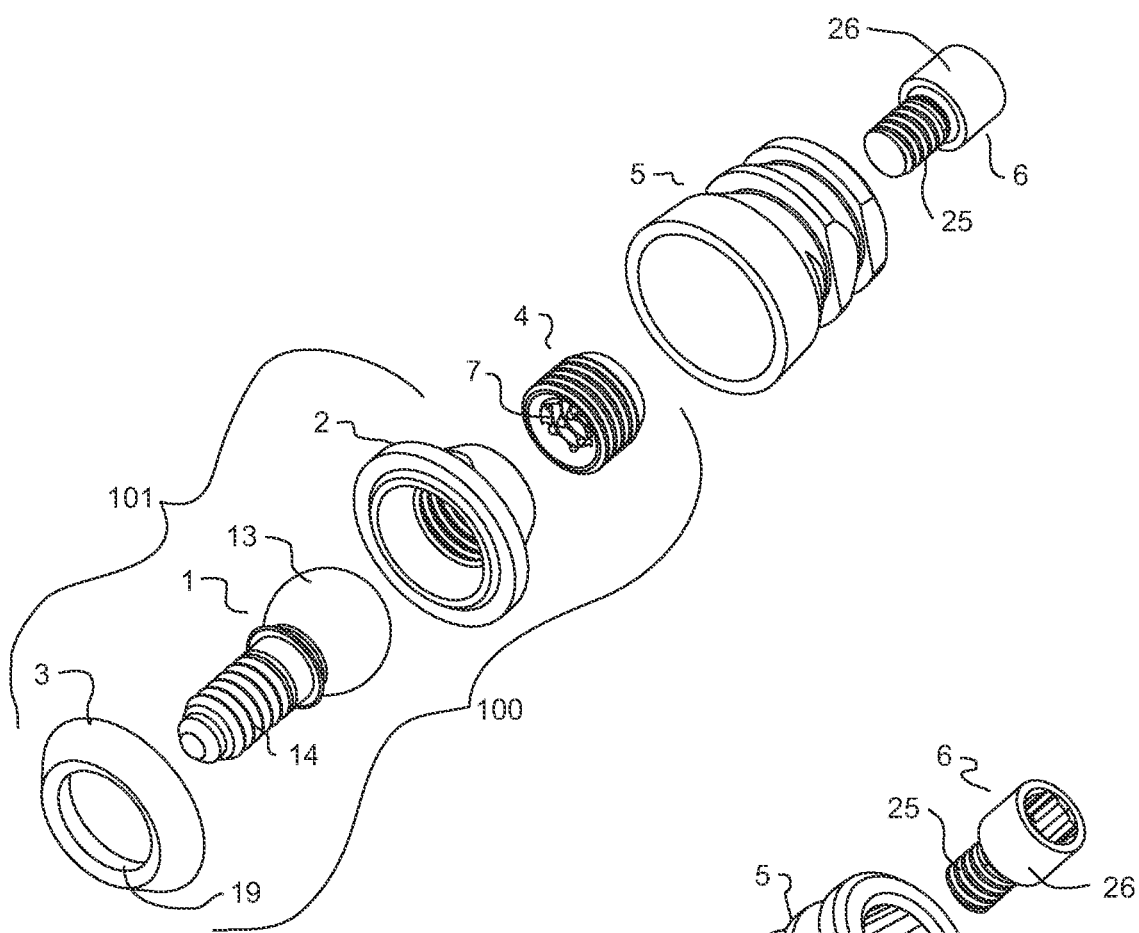
FIG. 1 is a bottom exploded isometric view of a first embodiment of an omnidirectional multi-unit abutment assembly with Ti base and prosthetic screw.
Figure 2:
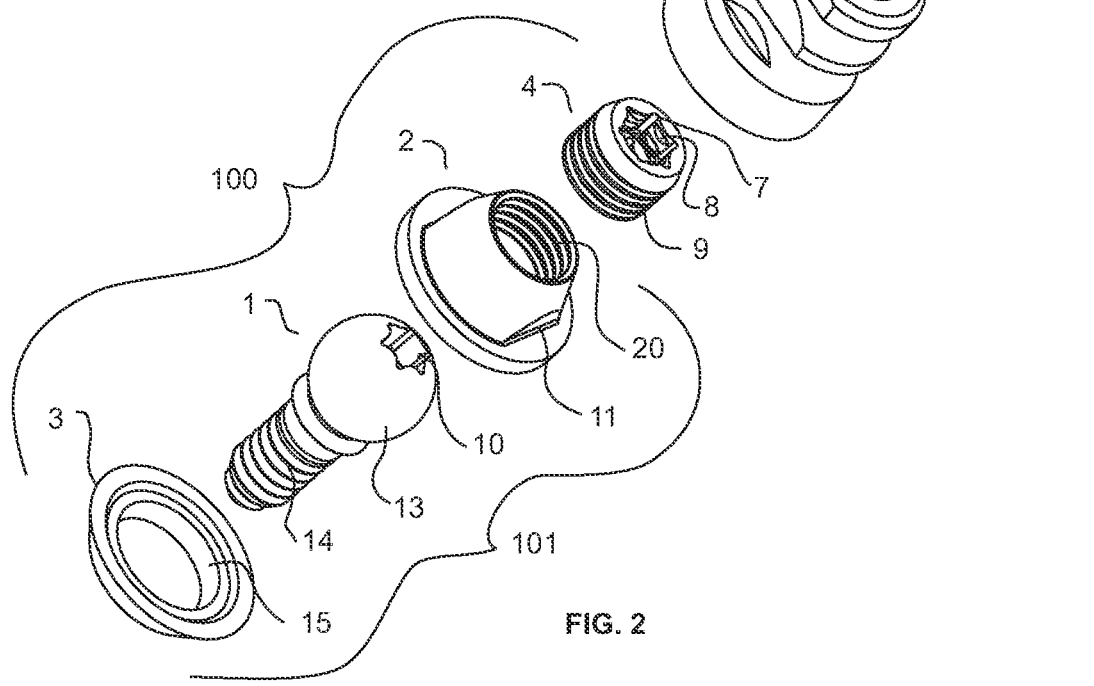
FIG. 2 is a top exploded isometric view of a first embodiment of an omnidirectional multi-unit abutment assembly with Ti base and prosthetic screw.
Figure 3:
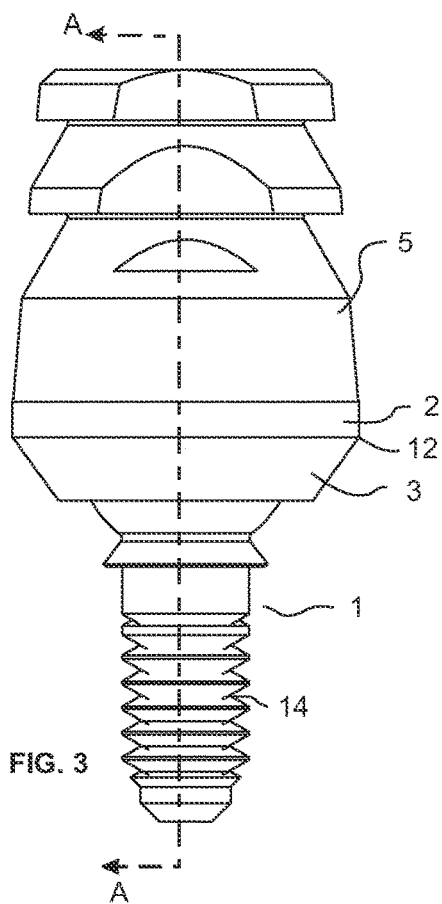
FIG. 3 is a side plan view of the assembled system of FIGS. 1 and 2 without the prosthetic screw with longitudinal axes of components aligned.
Figure 4:
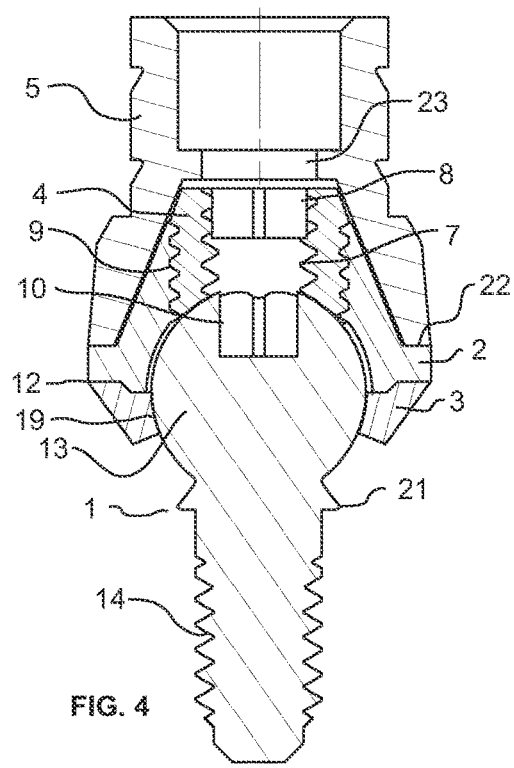
FIG. 4 is a side cross-sectional view of the assembled system of FIG. 3 taken through the longitudinal axis.
Figure 5:
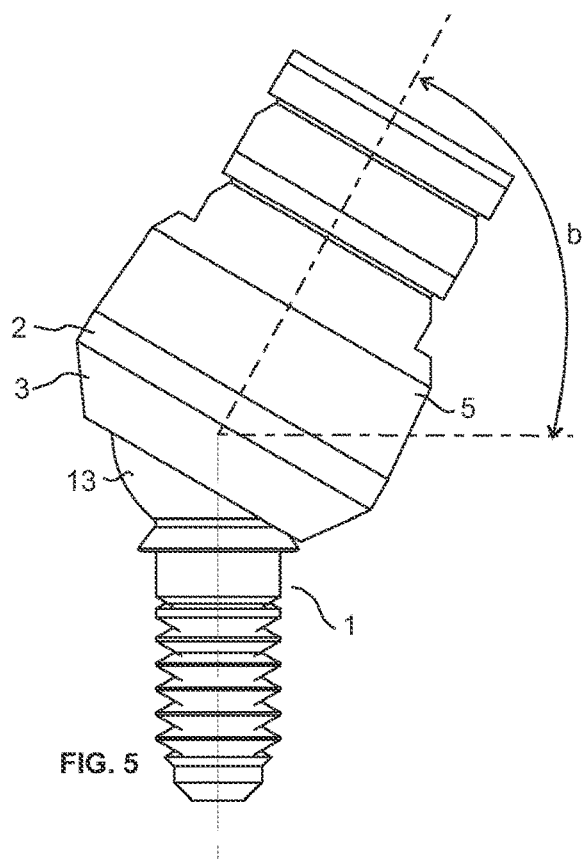
FIG. 5 is a side plan view of the assembly of FIG. 4 after reorienting the swivel shell and Ti base.
Figure 6:
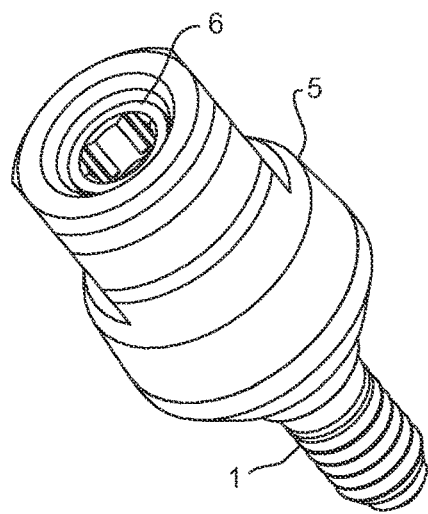
FIG. 6 is a top isometric assembled view of the omnidirectional multi-unit abutment of FIGS. 1 and 2.
Figure 7A:
FIG. 7 is a side cross-sectional view of the assembly of FIGS. 3 and 4 during the attachment to the implant. Inset FIG. 7A includes a relative scaling of the implant drive tool.
Figure 8A:
FIG. 8 is a side cross-sectional view of the assembly of FIGS. 3 and 4 after reorienting the swivel shell and Ti base as in FIG. 5 showing the fixing of the orientation with the lock screw. Inset FIG. 8A includes a relative scaling of the lock screw drive tool.
Figure 7:
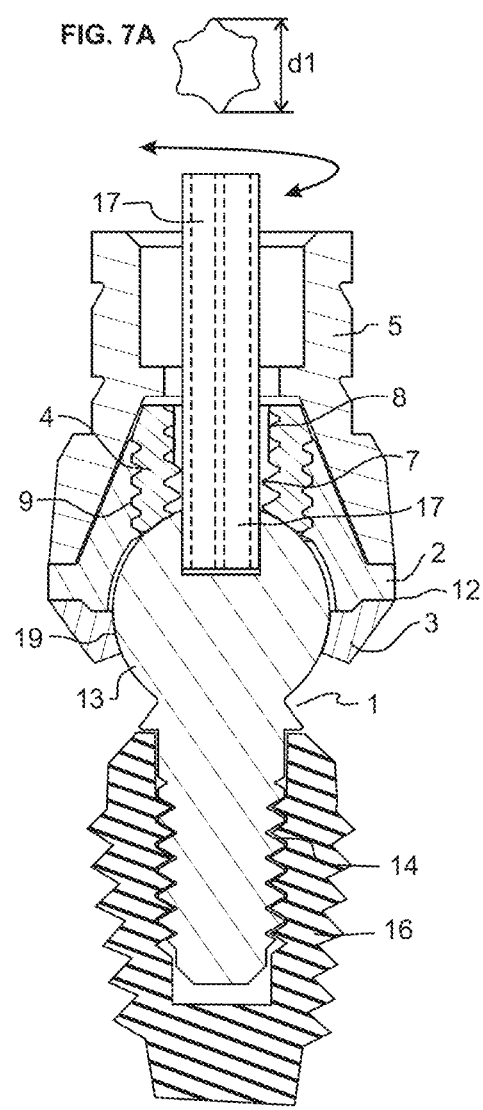
Figure 8:
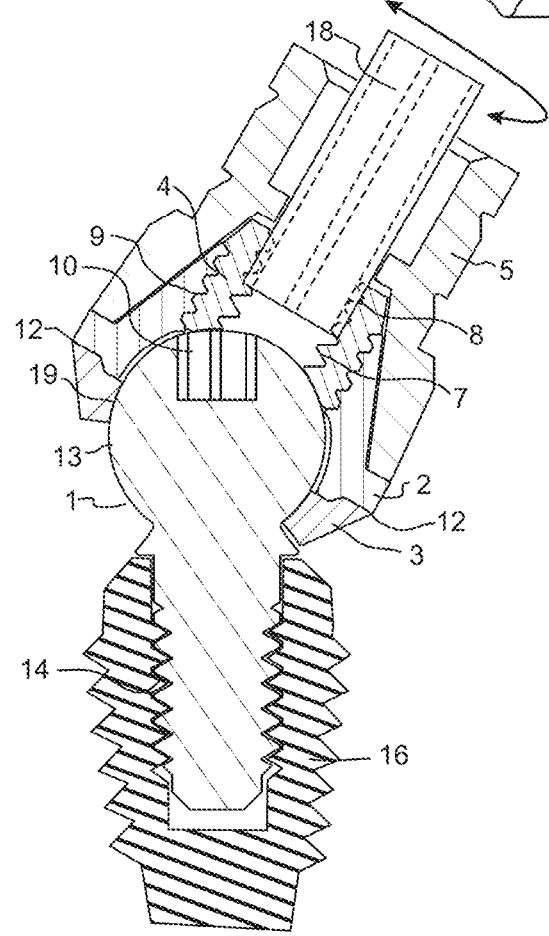
Figure 9:
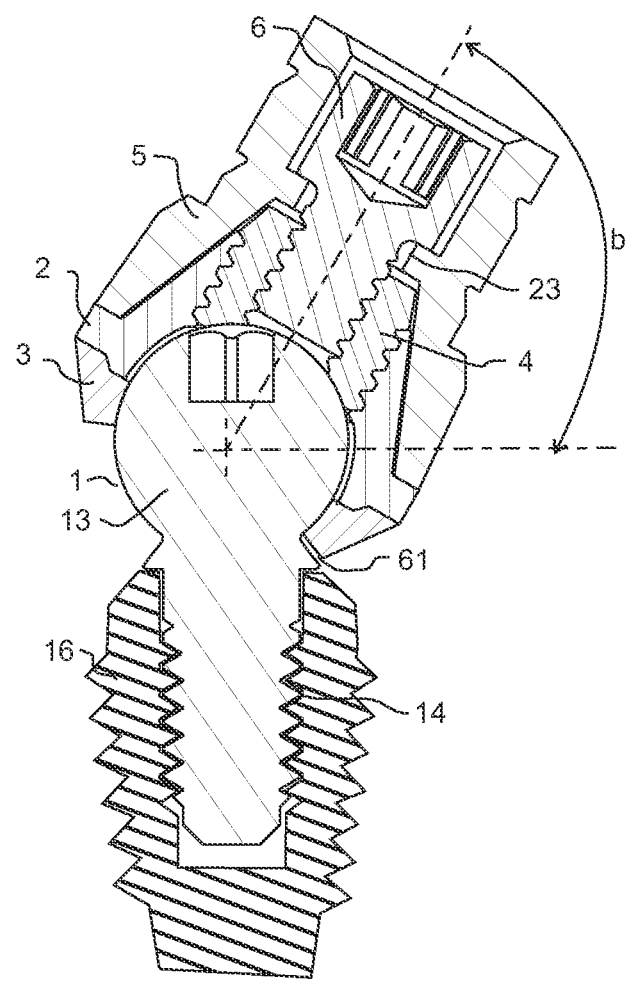
FIG. 9 is a side cross-sectional view of the assembly of FIG. 8 after fixing the Ti base with the prosthetic screw.
Figure 10:
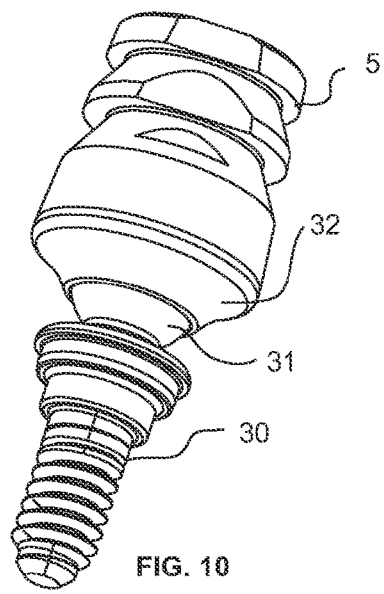
FIG. 10 is a bottom assembled isometric view of a second embodiment of an omnidirectional multi-unit abutment and Ti base in a linear configuration.
Figure 11:
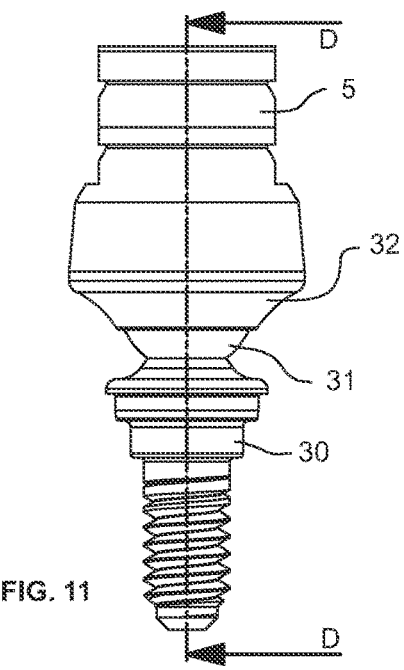
FIG. 11 is a side plan view of the embodiment of FIG. 10.

There are multiple embodiments included in this disclosure to illustrate options for providing the benefits of a screw-attached omni-directional multi-unit abutment. FIG. 1 and FIG. 2 illustrate an exploded view of one embodiment of an omnidirectional multi-unit abutment 100 comprising four parts: an abutment base 1, swivel mount 2, swivel base 3, and lock screw 4. A representative Ti base 5 and prosthetic screw 6 are also shown in the exploded drawings of FIG. 1 and FIG. 2. This omnidirectional multi-unit abutment assembly 100 may be made of titanium or any other suitable material for implant abutment systems including precious and non-precious metals and alloys, ceramics, and high-strength engineering polymers (e.g. PEEK, PEI), or combinations of the aforementioned materials. Treatments, coatings or gels may be added to surfaces or in spaces between parts to prevent undesired biological growth or advance healing. FIG. 3. shows the elements of FIGS. 1 and 2 except for the prosthetic screw 6 in a linear orientation. FIG. 4. illustrates internal features of the assembly of FIG. 3 along the longitudinal cross-section designator A-A of FIG. 3. Note that the presence of the Ti base 5 is shown for illustration purposes in FIG. 4. Ti base 5 is ultimately retained in the prosthesis (not shown) and attached to the omnidirectional multi-unit abutment using prosthetic screw 6 as shown in FIG. 6. Prosthetic screw 6 may be a permanent screw or may be a provisional fastener of the type described in co-owned U.S. Pat. No. 11,311,354 and other applications related by continuity. FIG. 6 is a perspective view of the assembly of FIGS. 1 and 2 in a linear configuration. FIG. 5 is a side view of the embodiment tilted at about 30 degrees. FIGS. 7-9 show different stages in the installation of this embodiment into an implant and adjustment.

The abutment base 1 includes a ball or spherical portion 13 which may be approximately 3.25 mm in diameter with an abutment base drive feature 10 on the proximal end. As illustrated, this drive feature may be a hexalobular internal (Torx) drive feature socket of T5 size centered on the longitudinal axis at the top of ball portion 13. Other types of drive tools may be used. At the distal end of the abutment base 1 is a threaded portion 14 for attachment to female threads of an implant 16 that is secured into the patient's jaw bone. The implant 16 and its attachment to the mandible or maxilla bones are described schematically in this disclosure since the inventive concepts of the omnidirectional multi-unit abutment can be adapted to interface with different abutments. The generic implant 16 illustrated in FIG. 7 with female threading is a very common design, but the abutment base attachment 14 and seating 21 may be adapted to conform to other implants.

The swivel base 3 includes an aperture 19 and an interior curvature portion 15 which is sized and shaped to essentially match the curvature of the ball portion 13 of the abutment base 1. The swivel mount 2 illustrated includes internal threading 20 for attaching to the external threads 9 of the lock screw 4. It also includes a Ti base seating feature 22 for supporting and orienting the Ti base 5 when it is mounted with the prosthetic screw to the omnidirectional multi-unit abutment 100. The swivel mount may optionally include engagement features 11 that may be used to attach a tool such as a wrench to aid assembly or to restrict the azimuthal orientation (not illustrated) of the Ti base 5. Restricting the orientation of a Ti base with matching engagement features of a Ti base and implant abutment is a common technique which is useful for single tooth crowns. The omnidirectional multi-unit abutment 100 embodiments herein can be readily adapted to single tooth prostheses by fixing the azimuthal orientation of a non-cylindrically symmetrical Ti base with a matching abutment mounting surface which will not be described in detail.

The ball portion 13 of the abutment base 1 may be captured between the swivel base 3 and the swivel mount 2 which comprise a swivel shell around the ball portion 13 with the abutment base screw thread portion 14 extending through swivel base aperture 19. For this insertion process, the aperture 19 must be larger than the abutment seat projection 21. The swivel base 3 and swivel mount 2 are preferentially joined at interface joint 12 by continuous welding or spot welding, for example, with a laser after positioning around ball 13 to form base assembly 101. This joining technique provides a strong assembly of a thinner shell over a shorter distance, but other joining techniques may be used to capture the ball portion 13 within a shell. As shown in the cross-sectional view of FIG. 4, after joining, the mechanical design of the internal curvature 15 and aperture 19 of the assembled swivel base 3 and swivel mount 2 may be designed to prevent the ball portion 13 of the abutment base from escaping the swivel shell. The relative sizes and shapes of the aperture 19 and the size and shape of the abutment base 1 at the abutment seat projection 21 determine the range of tilt possible. In general, if the swivel base aperture 19 and the minor diameter or width of the internal threads 20 of the swivel mount are both less than the width of the ball 13, then the ball 13 is captured within a shell absent the lock screw 4.

The lock screw 4 illustrated has external threads 9 to engage the internal threads 20 of the swivel mount 2. These threads may be, for example, m3×0.35 size. Lock screw 4 also has internal threading 7 for attaching the prosthetic screw 6 and an internal drive feature 8 for tool attachment to tighten the lock screw 4 in the swivel mount 2. Representative prosthetic screw sizes include m1.4×0.3 threads, m1.6×0.35, UNF 1-72, etc. Drive feature 8 may be a socket accommodating common dental drivers including Torx T5 or T6, 0.035" to 0.050" hex or square drivers, or similarly sized straight and star drivers. As illustrated, the internal threading 7 and drive feature 8 have a partial overlap along the longitudinal axis of the lock screw. This is a design choice. Complete axial overlap or no axial overlap are other design options.

The swivel base 3 is configured to engage a segment of the spherical ball feature 13 when lock screw 4 is tightened. The figures and cross-sections shown illustrate an embodiment where the swivel base and mount may be positioned and rotated anywhere within a 30-degree cone as shown in FIG. 5 and FIG. 8. The tilt magnitude and orientations of adjustment allowed are a design choice, although 30 degrees of tilt is generally sufficient for most clinical applications. As shown in this embodiment, the swivel base aperture 19 and the aperture with threading 20 in the swivel mount 2 are smaller than the diameter of the ball portion 13. In this case, the ball portion of the abutment base 13 may be loosely captured by the swivel base 3 and swivel mount 2 when these two parts are mutually attached. That is, the lock screw 4 does not have to be attached to the swivel mount 2 to have a shell that captures the ball portion 13 with the illustrated embodiment. This is a design option, not a requirement for benefitting from the inventive concepts of this disclosure.

The cross-sectional view in FIG. 4 of this omnidirectional multi-unit abutment embodiment with Ti base 5 may be used to illustrate some of the advantages of the preferred geometric relationships between elements. As shown, the ball portion 13 is spherical throughout the range of motion of the shell formed by the swivel base 3, swivel mount 2 and lock screw 4. The tilt range limitation due to interference of the swivel base 3 proximate the aperture and the abutment base 1 surface 61 near the abutment seat 21 has been labeled as angle b in FIG. 5 and FIG. 9. The interior curvature of the swivel mount 2 is essentially the same as that of the ball portion 13. The lock screw 4 also has essentially the same curvature as the ball 13 in the area of contact. The interior curvature 15 of the swivel mount 2 is preferentially slightly larger than the curvature of the ball 13. As a result, when the lock screw 4 is tightened, the ball portion 13 is contacting the interior curvature 15 of the swivel base 3 and a corresponding interior curvature of the lock screw 4. Since the interior curvature of the swivel mount 2 is larger, it does not contact the ball when the lock screw 4 is fully tightened. This provides a more consistent continuous circular seal of the swivel base to the ball to help block the ingress of biological contamination into the interior of the omnidirectional multi-unit abutment assembly. In the linear configuration of FIG. 4, the lock screw 4 also provides an equivalent circular seal with the ball portion 13. As illustrated in the maximum tilt condition of FIG. 9, the continuous seal of the swivel base 3 to the ball is maintained. However, the seal of the lock screw 4 to the ball 13 is not continuous due to the abutment drive feature 10. However, when the Ti base 5 and prosthetic screw 6 are applied to the omnidirectional multi-unit abutment, the abutment drive feature 10 is effectively sealed.

The relatively large ring contact of the hollow lock screw 4 to the ball 13 distributes the clamping force over a larger area than the concentrated contact of a solid set screw. The extended contact and matching curvature 15 of the swivel base to the ball 13 has been determined to have sufficient frictional grab to allow tightening the lock screw 4 in excess of 25 Ncm without holding the swivel base 3 or swivel mount 4 when parts are made of titanium. The relatively large contact area also minimizes distortion of the ball 13 from clamping compared to a concentrated sold set screw, which eases repositioning of the tilt or azimuthal angles without interference from distortions of the ball 13 geometry. The relatively large outer diameter of the locking screw 4 also provides sufficient wall thickness between internal threading 7 and external threading 9 for mechanical strength for applying torque to the lock screw 4 with drive tool sizes comparable to the width of the threads of the prosthetic screw 6.

A relatively large lock screw 4 provides a sufficient number of engaged external lock screw threads 8 with the internal threads 20 of the swivel mount to provide stable clamping forces on the ball 13. Although threads (not illustrated) can also be used at the joint 12 between the swivel mount 2 and swivel base 3, the omnidirectional multi-unit abutment diameter would need to be increased to have sufficient wall thickness and engaging thread depth to have equivalent strength to the relative sizes shown in FIG. 4. However, if it is desirable to prevent over-torquing of the lock screw 4, limited engagement of screw threads between the swivel mount 2 and swivel base 3 could be used to cause separation when a threshold torque is reached. Other options for torque limiting include tailoring the preferred welded joint strength described above, increasing the aperture 19 size in the swivel mount, and/or introducing intentionally thinner wall sections in the swivel base proximate the aperture 19 that have lower torque resistance. Although intentional failure by design will likely result in loss of the omnidirectional multi-unit abutment, this may be preferable to excess stress that could result in a future failure of the prosthesis or implant retention.

The hollow style lock screw 4 and drive geometries illustrated in FIG. 4 provide benefits in dental system installation and maintenance. After the swivel base 3 is attached to the swivel mount 2 to form base assembly 101, the ball portion 13 of the implant base is captured by the shell portion formed by the swivel mount 2 and swivel base 3. The lock screw 4 may be started into the swivel mount 2 and rotated enough to secure it but without contacting the ball portion 13 to form the omnidirectional multi-unit abutment assembly 100. The Ti base 5 may be optionally placed on top of the omnidirectional multi-unit abutment assembly and parts aligned along a common axis as shown in FIGS. 3 and 4. Ti base 5 is not required to be in place during installation and orientation of the abutment base 1, swivel base 3, swivel mount 2 and lock screw 4. Thus aligned, a drive tool 17 may be inserted through the Ti base 5 and the lock screw 4 to engage the drive feature 10 of the abutment base 1 as illustrated in FIG. 7. Note that it may be necessary to slightly rotate drive tool 17 after passing through the lock screw 4 in order to engage the abutment base drive interface 10. Preferably the engagement fit of the drive tool 17 and abutment base drive feature 10 has sufficient friction to cause the omnidirectional multi-unit abutment 100 to remain on the drive tool 17 to present the omnidirectional multi-unit abutment assembly to the implant 16 as shown in FIG. 7. A slight torquing of the lock screw 4 in the unwind direction may help in this retention. As the drive tool 17 is rotated, the abutment base threads 14 engage the implant 16 and the omnidirectional multi-unit abutment assembly may be screwed down to attain the desired seating of the abutment seat 21 to the implant 16. Since the drive tool engages both the abutment base 1 and lock screw 4, these parts rotate simultaneously. Since the lock screw 4 position is not changing with respect to the abutment base 1, the ball portion 13 is not being gripped between the swivel base 3 and the lock screw 4. The rotational force from the drive tool 17 is drives the abutment base threads 14 deeper into the implant 16.

The seating portion 21 of the abutment base that contacts the implant can be modified to match the seating geometry of fixed angle abutments. The drive feature 10 allows for securing the abutment base 1 threaded portion 14 to the implant 16. The tightening of the abutment base 1 to the implant may proceed until the desired seating pressure at the abutment seat 21 is obtained. A representative torque value is about 30 Ncm, although the value will depend upon the implant system employed and may be higher or lower than this. For immediate loading of a prosthesis, the torque value should be less than the torque value used to install the implant into the jaw bone.

As shown in FIG. 8, once the abutment base 1 is secured to the implant 16, the linear configuration of FIG. 7 is no longer needed. The tilt and azimuth angle of the swivel mount 2 to receive Ti base 5 desired for prosthesis attachment can be selected by movement of drive tool 18 which is inserted into lock screw 4. Rotating drive tool 18 causes the lock screw 4 and swivel base 3 to clamp ball portion 13 and lock the angulation of the omnidirectional multi-unit abutment 100. Engagement features 11 may be included to prevent the lock-screw and swivel base from rotating while the lock screw 4 is tightened. Other engaging features such as small holes or splines may also be used as anti-rotation or azimuthal selection features for this purpose. In the case of a single tooth prosthesis, a selection feature on the swivel mount 2 engaging a rotational fixing feature on a Ti base allows the azimuthal angle of the Ti base to be selected and held while tightening the lock screw 4. A coaxial two-piece tool that engages the anti-rotation features and includes a drive tool similar to 18 may be used to orient and tighten the swivel mount 2 and lock screw 4 in position on the ball portion 13 of the abutment base 1. Having the Ti base 5 included in the arrangement of FIG. 5 may be convenient for azimuthal selection.

The drive feature 7 of the lock screw 4 is preferably accessible through the Ti base 5 in both a provisional and the final prostheses. This allows moving and re-torquing the lock screw 4 in the proper orientation should it loosen over time, making minor adjustments to improve passive fit, and replacing and realigning one omnidirectional multi-unit abutment 100 within a plurality of omnidirectional multi-unit abutments 100. From a comparison of the drive tool dimension d1 shown in the inset FIG. 7a to the drive tool dimension d2 shown in the inset FIG. 8a, the drive tool 18 shown in FIG. 8 is larger than the drive tool 17 in FIG. 7. This is not required. A benefit of using two different sizes, for example, a T5 driver 17 to drive the abutment base 1 and a T6 driver 18 for securing the lock screw 4 provides extra clearance in the lock screw 4 while driving the abutment base. Since the torque used for driving the abutment base 1 may be chosen to be higher than the torque used for the lock screw 4, a first torque wrench with drive tool 17 and a second torque wrench with drive tool 18 may help ensure the desired torques are obtained. Of course, in order to allow the assembled omnidirectional multi-unit abutment 100 to be installed into the implant 16 as shown in FIG. 7, the size and shape of the drive tool 17 must pass through the lock screw 4. The drive tool 18 in FIG. 8 is prevented from passing completely through the lock screw 4 since the lock screw internal drive interface 8 shown does not extend all the way to the distal side of the lock screw 4. This is a design choice.

Some practitioners may choose to use their muscle memory experience instead of a calibrated objective tool to determine when a predetermined desired torque is applied to the implant base 1 and the lock screw 4. If the abutment base drive interface 10 and lock screw drive interface 8 are the same size and shape, then one tool can be used for drive tool 17 and 18. In this case, after driving the abutment base 1 into the implant 16 as in FIG. 7, drive tool 17 would only need to be extracted just enough to disengage with the abutment base drive interface 10 before repositioning it to lock the omnidirectional multi-unit abutment 100 position by rotating lock screw 4. If different calibrated torques are desired, two different wrenches could be used with the same drive tool tip size. Some practitioners may prefer to leave the drive tip inserted in the omnidirectional multi-unit abutment for both torquing process steps and switch torque wrenches set to different values. Since the rotational axis of drive tool 17 is generally different than drive tool 18, using the same torque magnitude for the abutment base 1 and lock screw 4 may be acceptable. A torque wrench that has a push button or other selector to switch between two different torque settings may be useful. Automatic selection could be based on the difference between the deeper drive tool depth required to engage the abutment base drive interface 10 compared to the lock screw drive interface 8, for example, by requiring a force along the axis of the drive tool tip to cause a spring loaded sheath to engage the higher torque mechanism. In this case, the lower torque setting could remain engaged, if desired, although it would slip.

FIG. 9 shows is a cross-sectional view of the omnidirectional multi-unit abutment assembly 100 including prosthetic screw 6 that retains Ti base 5. Prosthetic screw 6 may be replaced with a separable fastener (not shown) as described in the referenced U.S. Pat. No. 11,311,354 to facilitate positioning of the Ti base 5 into the prosthesis with a lift off process. Note that even after the Ti base 5 is incorporated into the prosthesis, it is possible to access the lock screw drive interface 8 by removing the prosthetic screw 6. This is essentially changing the configuration from FIG. 9 to FIG. 8. This benefit will be described in more detail after other embodiments are presented.

A variation of the embodiment shown in FIG. 1 through FIG. 9, is illustrated in FIG. 10 through FIG. 13. From a practical design standpoint, given constraints of conventional abutment diameters, seating heights (the distance between the seating surface 22 for the Ti base 5 and implant seating surface 21 in the first embodiment) and other dimensional constraints, omnidirectional multi-unit abutment designs may also include embodiments in which the abutment base 30 and ball or spherical feature 31 are initially separate components. In the embodiment of FIGS. 1-9 the ball is approximately 3 mm diameter. A nominal seating height of approximately 2.5 mm is illustrated in the figures.

The second embodiment illustrated in FIGS. 10-13 is shown with about the same dimensions to work with the same implant 16 and Ti bases 5 as the omnidirectional multi-unit abutment assembly 100 shown in FIGS. 1-9. The seating height between the abutment seat 42 and Ti base seat 41 is also comparable. The major difference is that the swivel 32 is captured between portions of a two-part abutment base 30. The abutment base 30 in FIG. 12 comprises a separate ball portion 31 attached to a stem portion 34. A discrete 31 may be useful, for example, in case a swivel base will not fit through the required abutment diameter without interference. Consequently, the embodiment in FIG. 10 through FIG. 13 includes a ball 31 with drive interface 45 with distal mounting hole 46 that is attached to a mating post feature 35 of the abutment base stem portion 34. After inserting ball 31 into swivel 32, ball 31 is assembled to base stem portion 34 by any form of mechanical engagement such as press-fitting, heat-shrinking, laser-welding, adhesives, or combinations thereof. For example, ball 31 may have a light press-fit onto post 34 and a small radial laser-weld at interface 35. This method reliably joins the ball to the base, while minimizing mechanical precision, providing a fillet at the mating joint 35, and sealing this joint from liquid ingress.

Figure 12:
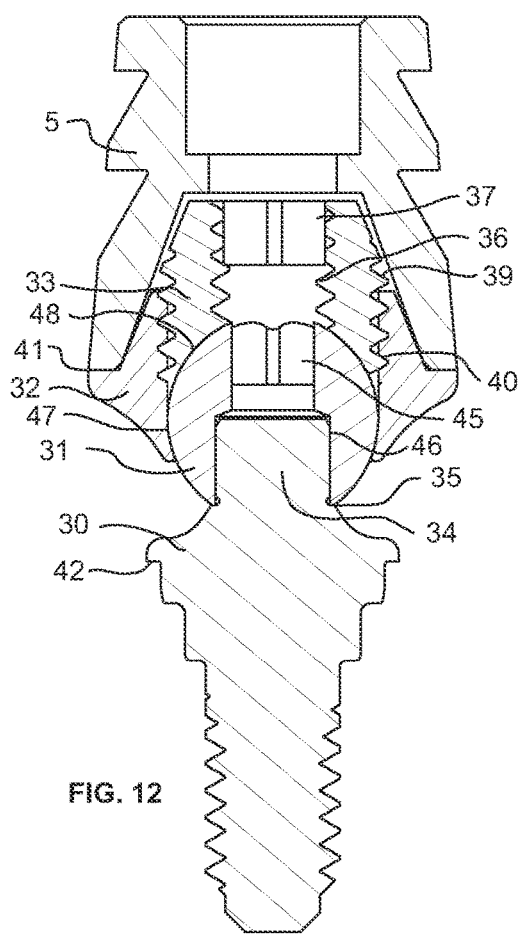
FIG. 12 is a cross-sectional view of the embodiment of FIG. 11 along the longitudinal axis.
Figure 13:
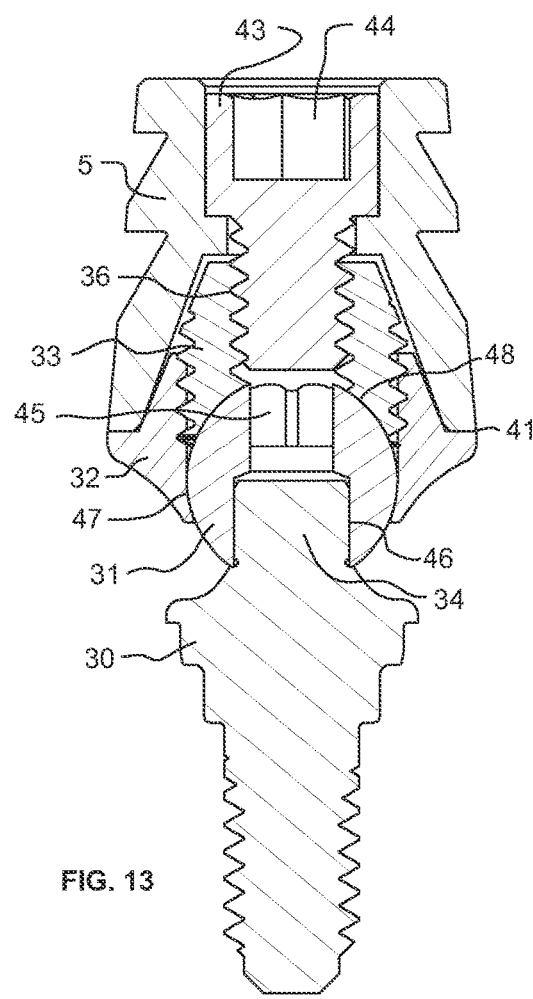
FIG. 13 is a cross-sectional view of the embodiment of FIG. 11 after the prosthetic screw is added.

In the embodiment illustrated, the minor diameter of the internal threading 38 of the swivel 32 is large enough to allow ball 31 to be inserted through the internal threads 40 of the swivel mount 32. The drive interface 45 may be used to orient the ball for assembly. After capturing the swivel 32 and installing and tightening the lock screw 33, the ball 31 contacts the swivel 32 along a seating surface 47. Approximately 17.5 degrees of seating/interference surface is illustrated in FIGS. 12-13. The lock screw 33 also makes contact with the ball 31 along interface 48. Various surface finishes and mechanical features may be employed to enhance the locking ability of mating surfaces 48 and 47 to ball 31, such as surface texture, ridges, or ribs. Note that this approach of capturing the swivel 32 to the ball prevents the swivel 32 from falling off the ball 31. The swivel 32 contacts the distal surface of the ball similar to the swivel base 3 of the first embodiment of FIGS. 1-9, but also provides the Ti base seat 41 to support the Ti base 5 in a known orientation analogous to that provided by of the previous Ti base seat 22 of swivel mount 2.

The lock screw 33 is similar to the lock screw 4 in the first embodiment. It contains prosthetic screw threads 36, drive socket feature 37, seating surface 48 and external threads 39. The proximal end of the ball portion 31 includes drive socket feature 45 that may be accessed through the lock screw 33 similar to lock screw 4 described above. When lock screw 33 is tightened using drive feature 37, the swivel 32 engages a seating surface 47 of the ball 31 which allows for the lock screw 33 to fix the swivel 32 in the ideal omnidirectional orientation up to thirty degrees off the implant axis and at the desired azimuthal angle. Again, Ti base 5 is does not need to be present during installation and orientation of the omnidirectional multi-unit abutment. Through proper selection of the sizes of prosthetic screw threading 36 and drive features 45 and 37 and 44, it is possible to utilize a single drive tool for the three steps of tightening the abutment base 30 into the implant (not shown), locking the orientation of the swivel 32 with lock screw 33, and tightening the prosthetic screw 44. For example, a single T5 drive tool typical of an M1.6×0.35 prosthetic screw 43 with threading 36 can be used if the drive interfaces 37, 44 and 45 also have T5 socket characteristics. Of course, in this case, the lock screw drive interface 37 would need to extend through the lock screw 33 (not shown) in order to engage the abutment base drive socket feature 45. The portion of the M1.6 prosthetic screw threads removed for the T5 driver has been determined to provide adequate thread integrity to properly retain the prosthetic screw. Other standard and custom threads and drive geometry combinations may also be used to allow the use of a single drive tool.

By assembling the ball 31 to the abutment base 30, the width of the abutment base 30 at the implant seating location 42 may be larger than in the first embodiment. In the first embodiment, the threaded end 14 of the abutment base 1 was inserted into the swivel base aperture 19 to contact the ball portion 13. The ball portion 13 was captured by joining the swivel mount 2 to the swivel base 3. By merging the characteristics of the swivel base 3 and swivel mount 2 into a one-piece swivel 32 in this embodiment, the size of the distal end of the abutment base is not constrained by the aperture at the distal end of the swivel 32 aperture. In the embodiment of FIGS. 10-13, the minor diameter of the lock screw external threads 39 must be larger than the diameter of the ball 31 to allow the ball to be inserted through the swivel 32 to be joined to the abutment base 30. A comparison of FIG. 12 with FIG. 4 shows that this results in a shorter depth for engaging threading between the swivel 32 and lock screw 33.

Figures 14, 15, 16:
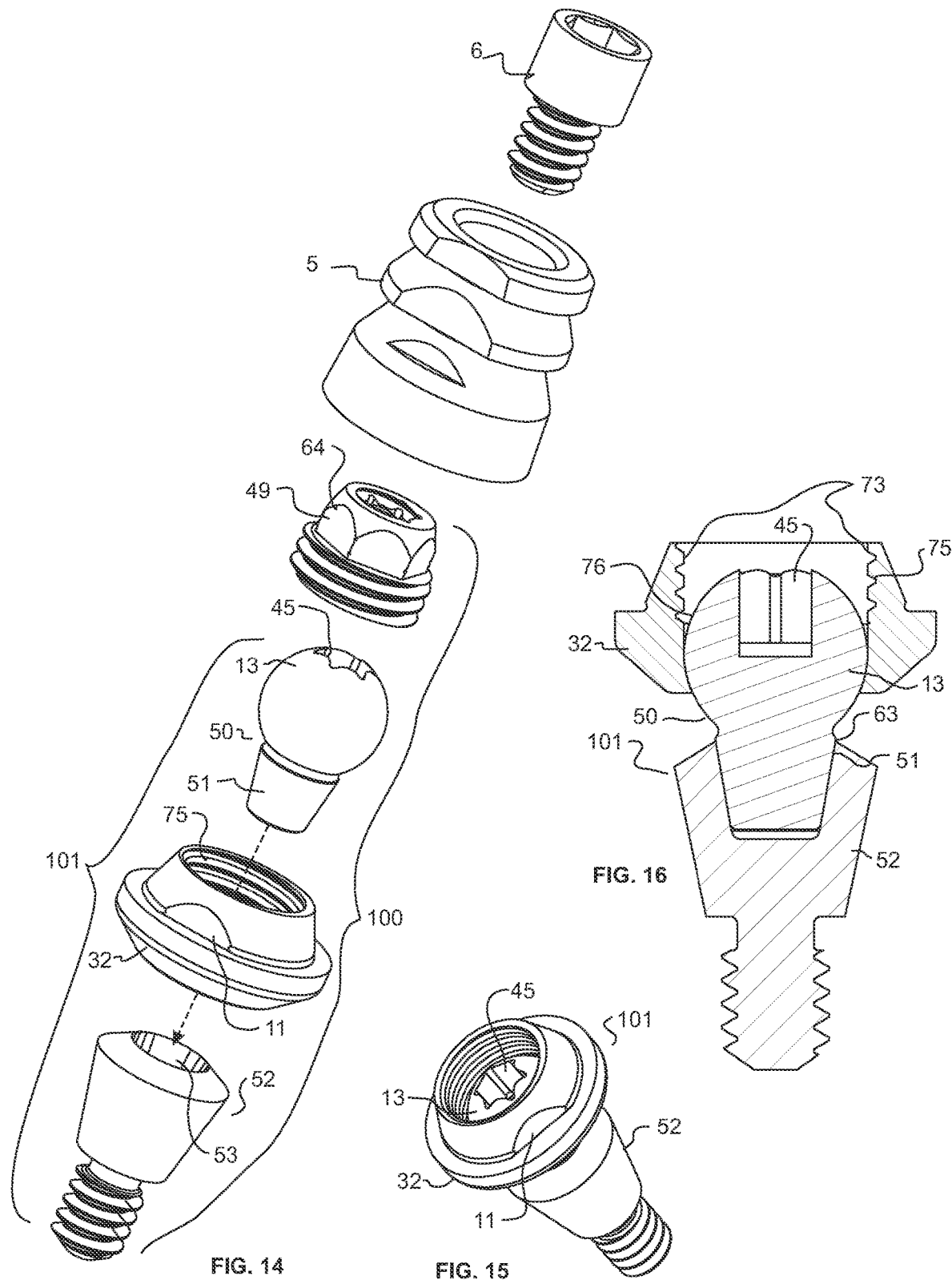
FIG. 14 is a top exploded isometric view of a third embodiment of an omni-directional multi-unit abutment with Ti base and prosthetic screw.
FIG. 15 is a top isometric view of the embodiment of FIG. 14 in a linear assembled configuration.
FIG. 16 is a cross-sectional view of the embodiment of FIG. 14 along the longitudinal axis.

Another approach for capturing a swivel shell component to an abutment base with a ball feature is shown in FIGS. 14-16. In this embodiment, the abutment base assembly 101 is fabricated from swivel 32 and a ball with taper stem 50 that has a ball feature 13 with drive feature 45 at the proximal end and tapered stem 51 at the distal end. The tapered stem 51 is joined to a base 52 having a tapered socket 53 at the proximal end and an abutment base screw thread 14 at the distal end. The widest part of the ball with taper stem 50 is the diameter of the ball 13. Swivel 32 is captured by inserting the tapered stem 51 into the proximal side of the swivel 32 before inserting the tapered stem 51 into the tapered socket 53.

FIGS. 15 and 16 show the abutment base assembly 101. As before, the tapered stem 51 and base 52 may be joined with different techniques. However, including welding at interface 63 is preferred. A comparison of FIG. 16 to FIG. 14 shows that the ball portion 13 of the ball with tapered stem 50 may have improved structural stability compared to abutment base ball 31. This may be important considering the small size of the parts and the desire to have smooth swiveling action and tight sealing of the parts when locked in position.

The lock screw 49 illustrated in FIG. 14 differs from the lock screws 4 and 33 in previous embodiments by including a hex drive feature 64 on its exterior surface near the proximal end. This hex drive feature 64 is provided to aid removal of a failed installation. For example, if the prosthetic screw stem 25 breaks off in the lock screw 4, the lock screw drive interface 8 may be plugged so that the drive tool 18 used for installing the omnidirectional multi-unit abutment cannot be inserted. As an alternative to removing the broken stem 25, a wrench (not shown) could be applied to the hex feature 64 to remove the lock screw 49. Of course, these hex features 64 would generally not be accessible with the Ti base 5 in position on the omnidirectional multi-unit abutment. As a result, the lock screw drive interface 37 is preferred for using the Ti base embedded in the prothesis to help align and lock the omnidirectional multi-unit abutment orientation to improve passive fit. If necessary, a wrench could also be applied to the flat 11 on the side of swivel 32 to help with removal of the plugged lock nut 49 since the Ti base 5 would not be covering it.

Figure 17:
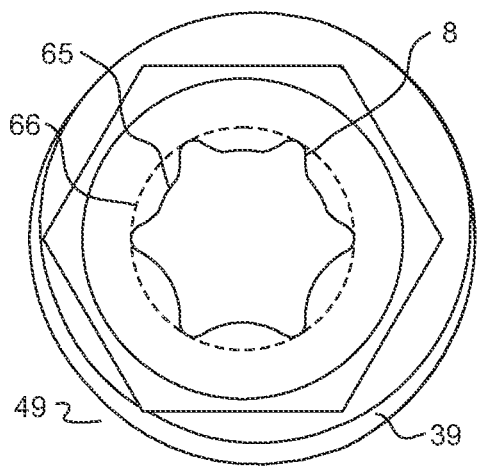
FIG. 17 is a top schematic plan view of a lock screw for the embodiment of FIG. 14 with a hexalobular internal (Torx) drive feature.

FIG. 17 is a top plan view of the lock screw 49. At the outer edge is the lock screw exterior threading 39 and at the center is the lock screw internal drive interface 8 which is shown as a Torx style. The major diameter 66 (dotted line) and minor diameter arc 65 of the lock screw internal threads 7 are shown. The minor diameter 65 is not a continuous circle but a series of discontinuous arc segments due to the lock screw internal drive interface 8 that is axially overlapping the lock screw internal threading 7. Note that the lock screw 49 has the lock screw internal drive interface 8 and the internal threading 7 extending all the way through the lock screw 49. In other words, there is essentially complete axial overlap of them through the thickness of the lock screw 49 so that a sufficiently long prosthetic screw thread 25 and a drive tool 18 can both pass through the thickness of the lock screw 49. The amount of material in the lock screw 49 that is available for the drive tool 18 to apply torque to lock the orientation of the omnidirectional multi-unit abutment 100 corresponds to the volume bounded by the major diameter 66 and minor diameter 65 of the internal screw threads 7 minus the material removed to provide the lock screw drive interface 8 socket for the drive tool 18 (not illustrated). The size and shape of the drive tool interface 8 can be modified to change the strength of the remaining internal threads 7 for holding the prosthetic screw 6 and maximum torque application to the lock screw 49 to fix orientation before damaging the internal threads 7.

Figure 18:
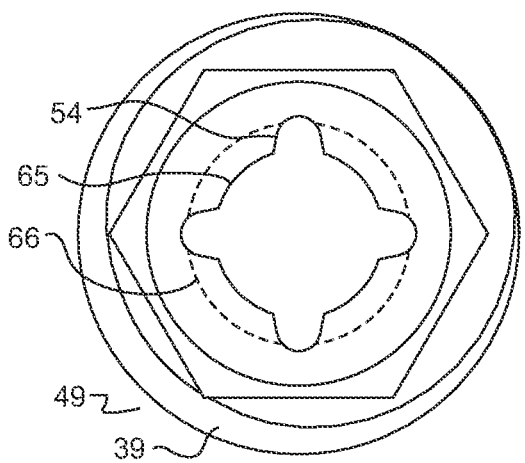
FIG. 18 is a top schematic plan view of the lock screw for the embodiment of FIG. 14 with a four-lobe internal drive feature.

FIG. 18 is a top plan view of the lock screw 49 with an alternate lock screw internal drive interface 54. This drive tool interface 49 has 4-lobes instead of the 6 lobes of the Torx drive tool interface illustrated previously. As a result of having fewer lobes and more pronounced lobe transitions, a visual comparison to FIG. 17 is sufficient to show that more of the internal threading is retained compared to FIG. 17. As a result, there are material and geometric trade-off options that are available to compensate for any mechanical strength degradation resulting from the axial overlap of the internal threading 7 and lock screw drive interface 54 that allows the final alignment and locking of the omnidirectional multi-unit abutment 100 to be done with the prosthesis in place.

Figure 19:
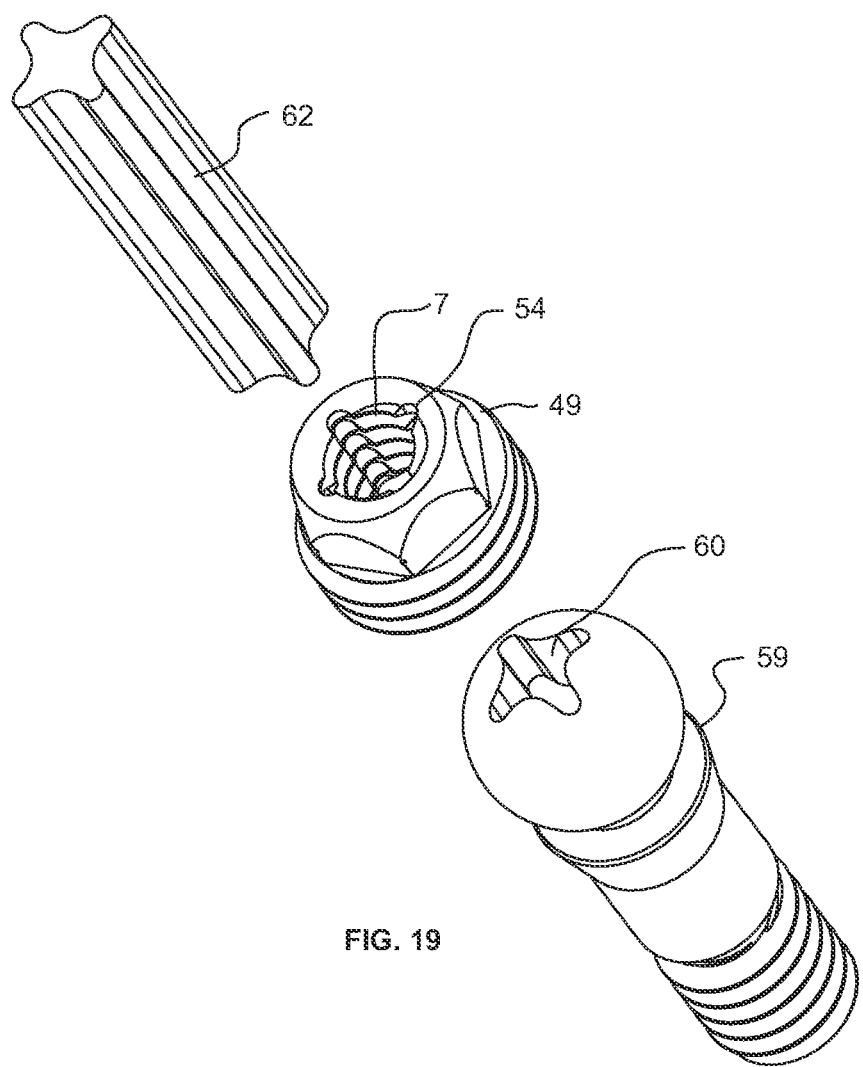
FIG. 19 is a top exploded isometric view of a four-lobe driver tip with lock screw and abutment base for the embodiment of FIG. 14.

FIG. 19 illustrates a 4-lobe drive tip 62 with the lock screw 49 of FIG. 18 and an abutment base 59 with a matching 4-lobe drive interface 60. The other parts of the omnidirectional multi-unit abutment 100 are not shown for clarity. Since drive tip 62 is sized to pass through the lock screw 49, it can be used to drive abutment base 59 into the implant 16 (not shown). Since the drive tip is sized to pass through the Ti base aperture 23 (not shown), it can also rotate the lock screw 49 to fix the position of the omnidirectional multi-unit abutment through the prosthesis (not shown) in which the Ti base 5 (not shown) is embedded.

Figure 20:
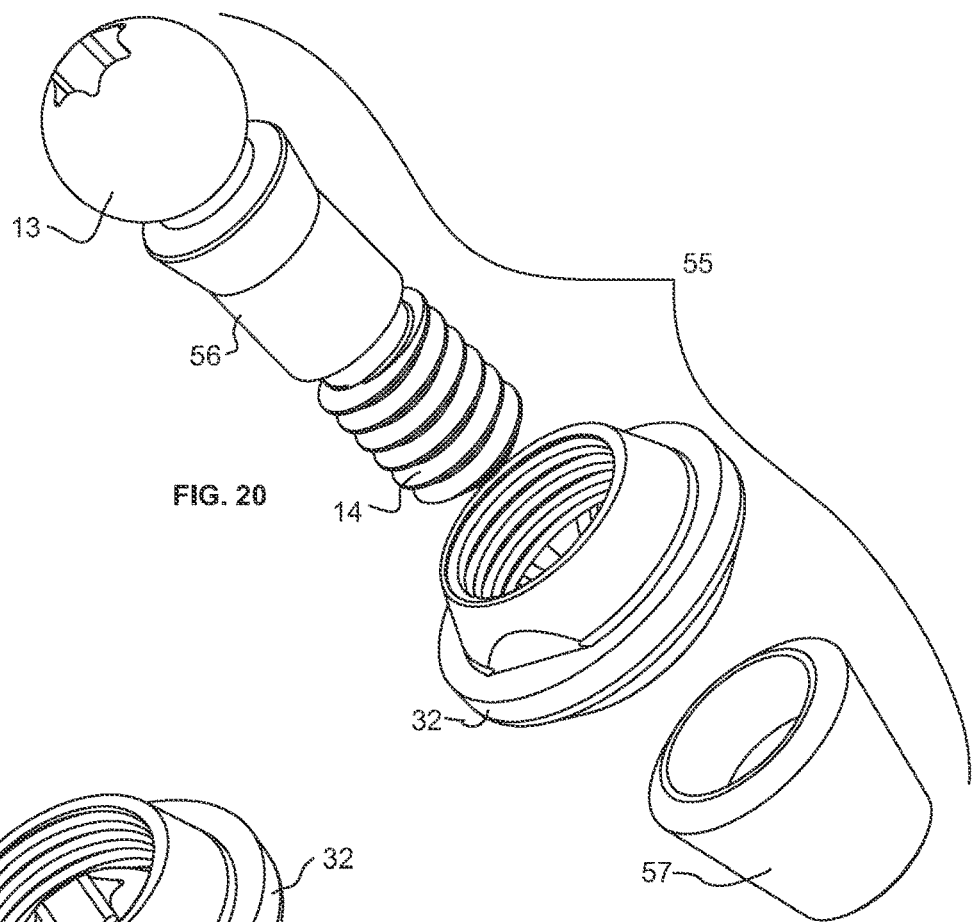
FIG. 20 is an exploded top isometric view of a two-part abutment base stem with sleeve and swivel mount for a fourth embodiment of an omni-directional abutment.
Figure 21:
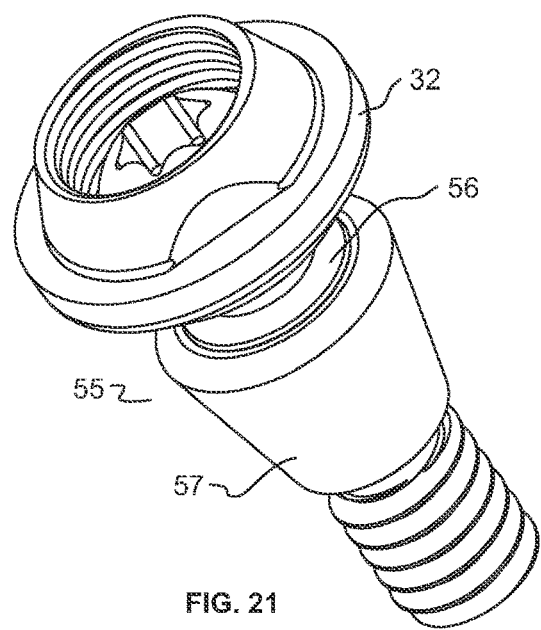
FIG. 21 is a top isometric view of the assembled two-part abutment base stem with sleeve and swivel mount of FIG. 20.
Figure 22:
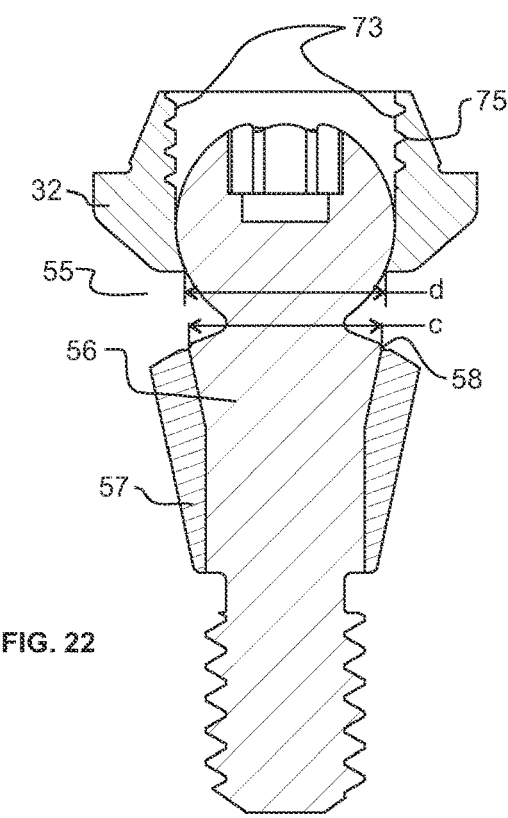
FIG. 22 is a cross-sectional view of the assembled two-part abutment base stem with sleeve and swivel mount of FIG. 21 along the longitudinal axis.

FIG. 20 illustrates another embodiment of a two-part abutment base 55 that is assembled to capture a swivel 32. In this embodiment, the ball portion 13 and the abutment base screw threads 14 are included in an abutment base stem 56. The distal end of the abutment ball base stem is inserted into the swivel 32 and then into a hollow sleeve 57 matching the interface requirements of the abutment 16 that will be used. The sleeve 57 has a maximum width that is larger than the diameter of the ball portion 13. As a result, when sleeve 57 is joined to abutment base stem 56, swivel 32 is captured. Any of the various joining operations mentioned above may be used, although including welding at interface 58 as shown on FIG. 22 is preferred. Also shown in FIG. 22 are two critical dimensions for the assembly process above. The minimum diameter "d" of the through aperture of the swivel 32 must be larger than the maximum width "c" of the abutment base stem 56 below the ball portion. Due to the similarities of this embodiment to previous ones, the other parts and characteristics will not be described.

Many other methods of capturing swivels on a ball with attached abutment connection assembly are possible such as different forms of male pins on the ball, female sockets on the abutment base, a threaded post on the ball or abutment. Although essentially spherical balls have been illustrated to demonstrate inventive concepts and provide maximum orientational flexibility, other shapes may be used to intentionally restrict orientation. Mating interfaces may be tailored to meet objectives in embodiments that have not been presented that still use one or more of the inventive concepts illustrated.

Figure 23:
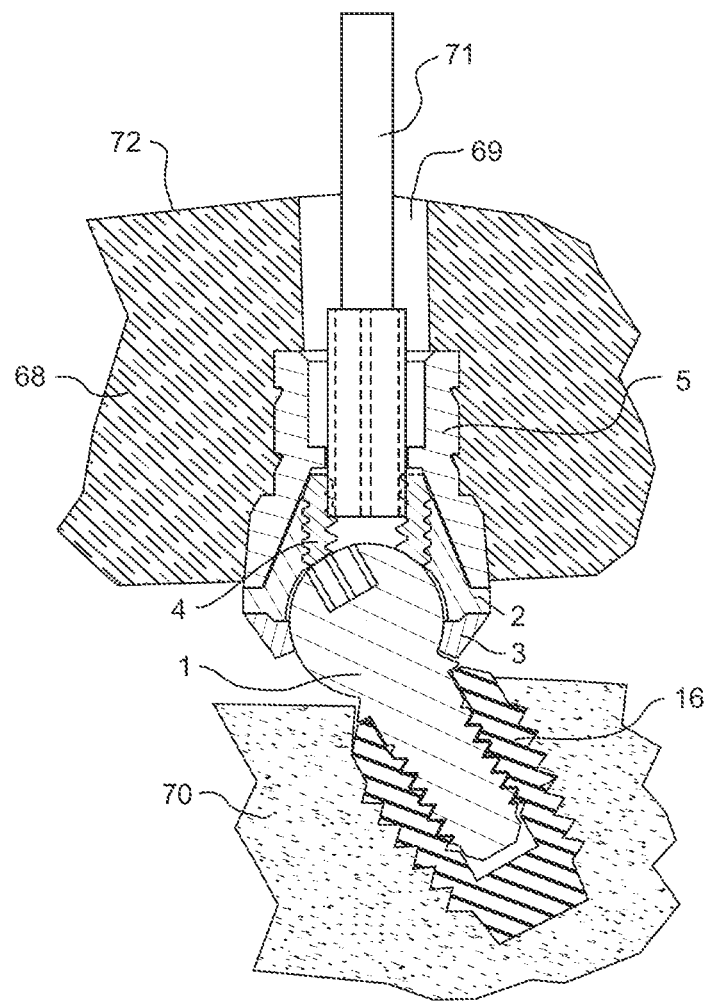
FIG. 23 is a cross-sectional view of the application environment of a representative embodiment of an omnidirectional multi-unit abutment including prosthesis and implant.

FIG. 23 shows a cross-section of the application environment of an installed omnidirectional multi-unit abutment 100 of the first embodiment. The implant 16 has been installed in the patient's bone and soft tissue shown schematically as 70. The abutment base 1 has been screwed into the implant 16 to a desired torque level. In this case, the swivel mount 2 has been tilted to essentially its maximum capability comparable to FIG. 8. The Ti base 5 is embedded in the prosthesis 68. The occlusal surface 72 of the prosthesis 68 is shown schematically as 72. The Ti base 5 is seated on the swivel mount 2, but the prosthetic screw 6 has been removed to allow the lock screw interface 8 (FIG. 1) to be accessible to a drive tool 71 through prosthetic screw access hole 69. Note that while a 4-lobe drive tool 71 is illustrated, a smaller drive tool (not shown) would be required to drive the abutment base 1 into the implant 16 as described previously for the first embodiment. As mentioned with the first embodiment, it may be beneficial to be able to make changes in omnidirectional multi-unit abutment orientation while the prosthesis is in position. FIG. 23 will be used to describe this in more detail.

Although only one implant is shown in FIG. 23, benefits of in situ adjustment are magnified when the prosthesis includes multiple Ti bases mating to multiple implants. During the fabrication or modification of the prosthesis for implant mounting, uncertainties in Ti base position may be accumulated. Due to the random nature of these shifts, the orientation and position of the Ti bases may drift from each other and from the position of the set of abutments initially used to orient the Ti bases with the prosthesis. Even if the Ti bases are positioned perfectly initially, the shape of the patient's jaw or the prosthesis may change over time. As shown in FIG. 23, removing the prosthetic screws 6 allow the lock screws 4 to be accessed and loosened with drive tool 71. Applying a re-seating force to the prosthesis 68 from the occlusal side 72 will push the embedded Ti bases 5 against the Ti base seats 22 thereby redirecting the orientation of the omnidirectional multi-unit abutment. Tightening the lock screws 4 with the drive tool 71 while maintaining the reseating force on the prosthesis 68 will lock this orientation. The prosthetic screws 6 can then be reinserted and torqued to secure the Ti bases 5 and prosthesis 68 in position. If it is desirable to check the torque on the lock screws 4 to see if they have loosened over time, this can also be done through the Ti bases 5 embedded in the prosthesis 68.

Similarly, if one omnidirectional multi-unit abutment 100 of a set fails and needs to be replaced, the prosthesis 68 with its embedded Ti bases 5 can be removed after removing all of the prosthetic screws 6. Reversing the angle setting and implant attachment processes shown in FIG. 8 and FIG. 7 will remove the failed omnidirectional multi-unit abutment assembly 100. Repeating the process of FIG. 7 to attach the new omnidirectional multi-unit abutment 100 to the implant 16 will result in the abutment base 1 being secured into the implant 16, but the shell consisting of the swivel base 3, swivel mount 2 and lock screw 4 will be loose. Minimal pressure on the lock screw 4 is sufficient to hold the orientation of the omnidirectional multi-unit abutment so that gravity doesn't cause it to move, but only require a minimal force application to change its orientation. Rough positioning of the swivel mount 2 sufficient to engage the Ti base 5 in the prosthesis 68 and manually applying pressure to the prosthesis from the occlusal side 72 will reorient the newly installed omnidirectional multi-unit abutment to align with the Ti base 5 already installed in the prosthesis. The lock screw 4 can then be tightened through the aperture 23 (FIG. 4) in the Ti base 5 in proper position as shown in FIG. 23. Whether the prosthetic screws 6 from the original omnidirectional multi-unit abutments 100 are used to maintain the alignment pressure on the newly installed omnidirectional multi-unit abutment 100 before tightening the lock screw 6 is optional.

Since the lock screw drive interface 8 is accessible through the Ti base 5 and prosthesis 68, a variation of the one-screw passive fit testing protocol may be used to make minor adjustments to the orientation of the omnidirectional multi-unit abutment to improve passive fit at the time of original installation. There are different options for exploiting the ability to reorient the omnidirectional multi-unit abutment 100 through the apertures 23 of the Ti bases 5 installed in the prosthesis 68. In one approach, all of the prosthetic screws 6 are removed. While the prosthesis 68 remains in place, all of the omnidirectional multi-unit abutment lock screws 4 are loosened and then made finger tight to provide some friction resisting, but not preventing swiveling slip. The actual torque value for being appropriately finger tight will depend upon the construction and surface finish of the omnidirectional multi-unit abutment, but will generally less than a few Ncm. Next, all of the prosthetic screws 6 are reinstalled and torqued to the recommended value. In this manner, the orientation of each of the omnidirectional multi-unit abutments will be more closely matched to the prosthesis 68. Next, a single prosthetic screw 6 is removed to provide access to the lock screw 4 of the omnidirectional multi-unit abutment in that position. The lock screw 4 is torqued to its predetermined value. The prosthetic screw 6 is reinserted and torqued to the predetermined value. This is repeated until all of the omnidirectional multi-unit abutment lock screws 4 have been tightened and all prosthetic screws 6 are tightened.

The fine adjustment process above may be modified depending upon the particulars of the initial level of passive fit. For example, it may be desirable to only loosen some of the omnidirectional multi-unit abutment lock screws 4 while leaving others fixed as anchor points from the original prosthesis fitting. This may result from a requirement to compromise passive fit somewhat for better occlusion or other reasons. Or the results of the traditional one screw or screw resistance tests may suggest orientational adjustment of only a subset of the omnidirectional multi-unit abutments or a different order of adjustment. In any case, these passive fit improvements follow directly from the capability of orienting and fixing the omnidirectional multi-unit abutment while the prosthesis is in place.

It is preferred that the omnidirectional multi-unit abutment 100 embodiments above be adapted to be compatible with Ti bases 5 and threaded implants 16 that have already been qualified and commercially successful. The threading and seating to widely available implants improves the inventory equation since the same implants may be used with conventional straight abutments as well as the embodiments above in the same patient. While less critical, the compatibility with widely available screw-attached Ti bases 5 is also seen as an advantage However, inventive features of the described embodiments can be integrated into or adapted to work with newly designed implants that adopt inventive concepts for passive fit improvement or installation efficiency and repair described above. These inventive concepts can also be adapted to work with prostheses that are not attached with screws. These adaptations are not excluded and are considered to be disclosed herein and within the scope of claims that may be broadly interpreted to apply to them. U.S. Pat. No. 11,311,354 includes different approaches for aligning Ti bases with abutments for incorporation into a prosthesis using a temporary fastener in a lift-off process. The basic design of the temporary fasteners illustrated in that co-owned patent can be employed with the omnidirectional multi-unit abutments and Ti bases described above.

Various embodiments have been described to illustrate the disclosed inventive concepts, not to limit the invention. Combining inventive elements of one or more of the embodiments with known materials, components and techniques in dental science to create further embodiments using the inventive concepts is considered to be part of this disclosure.

The invention claimed is:

1. A system for alignment and attachment of a dental prosthesis to an implant with a prosthetic screw, wherein the prosthetic screw comprises a head and a threaded shaft, the system comprising:
   an abutment base having a longitudinal axis, the abutment base comprising:
      a proximal end comprising a ball portion and an abutment base drive interface; and
      a distal end comprising screw threads for attachment to the implant;
   a swivel shell having an inner surface and an outer surface, wherein the swivel shell includes a swivel aperture proximate a distal end thereof and a threaded aperture at a proximal end thereof; and
   a lock screw having a longitudinal axis, wherein the lock screw comprises:
      a portion with external threads compatible with the threaded aperture of the swivel shell; and
      a portion with internal threads sized to engage the prosthetic screw shaft; and
      a portion with a lock screw drive interface comprising a socket for receiving a lock screw drive tool; and
   a Ti base, wherein the Ti base has an aperture on a proximal end portion that is larger than the threaded shaft of the prosthetic screw and smaller than the head of the prosthetic screw, wherein the Ti base has a distal end that is shaped to be supported by the swivel shell against a seating surface at a distal end of the swivel shell, and wherein the lock screw drive tool is sized to pass through the aperture of the Ti base without interference,
   wherein rotating the lock screw is capable of fixing an orientation of the longitudinal axis of the lock screw in an orientation that is not parallel to the longitudinal axis of the abutment base.

2. The system of claim 1 wherein the ball portion of the abutment base is compressed between a portion of the inner surface of the swivel shell and the lock screw.

3. The system of claim 1 wherein the swivel shell comprises a swivel base and a swivel mount that are mechanically assembled to capture the ball portion of the abutment base.

4. The system of claim 1 wherein the abutment base drive interface is a socket for receiving an abutment base drive tool, and wherein the abutment base drive tool has a longitudinal axis and an abutment base drive tip shaped to engage the abutment base drive interface.

5. The system of claim 4 wherein the abutment drive tool tip is sized to pass through the lock screw and into the abutment base.

6. The system of claim 5 wherein the abutment drive tool tip is configured to tighten the abutment base into the implant to a first torque without simultaneously tightening the lock screw.

7. The system of claim 1 wherein orientation of the swivel shell is selected by tilting the lock screw drive tool, in the lock screw, away from the longitudinal axis of the abutment base and tightening the lock screw to a second torque.

8. The system of claim 7, wherein the abutment drive tool is configured to be inserted in a first position in the abutment base drive interface and rotated to tighten the abutment base to the implant, wherein the abutment drive tool is configured to be inserted to a second position above the abutment base while inside the lock screw held in the swivel portion and rotated to tighten the lock screw to the second torque to lock the swivel portion in the selected orientation, and wherein the second torque is the same as the first torque or the second torque is different than the first torque.

9. A method for aligning and attaching a dental prosthesis to an implant with a prosthetic screw using the system of claim 1, the method comprising:
   attaching the lock screw to the swivel shell with the ball portion loosely constrained inside the swivel shell and with the abutment base screw threads extending through the swivel aperture to form a multi-unit abutment assembly;

inserting a tip of an abutment base drive tool through the lock screw to engage the abutment base drive interface;

presenting the abutment base drive tool and multi-unit abutment assembly to the implant;

rotating the abutment base drive tool to attach the abutment base to the implant to a first torque while the swivel shell and lock screw are in a first orientation to assemble the abutment base to the implant and define an implant abutment system;

disengaging the abutment base drive tool from the abutment base drive interface;

moving the swivel shell about the ball portion to a second orientation that is different from the first orientation;

pushing a prosthesis comprising at least one Ti base onto the implant abutment system whereby the swivel shell is moveable relative to the ball portion providing an in situ alignment adjustment to thereby facilitate seating of the Ti base;

tightening the lock screw against the ball portion using a tool inserted through the prosthesis, through an aperture in the Ti base and into the lock screw, wherein the tool is the abutment base drive tool or a different tool; and attaching the prosthesis to the implant abutment with a prosthetic screw.

10. The method of claim 9 wherein the pushing comprises applying force to the prosthesis to move the swivel shell into alignment with the Ti base, and wherein the tightening the lock screw is carried out using a lock screw drive tool or the abutment drive tool.

11. The method of claim 9, further comprising using a lift off process to couple the Ti base to the prosthesis before pushing the prosthesis comprising the Ti base onto the implant abutment system, wherein the lift off process is carried out using a temporary fastener, the temporary fastener comprising:

a post having an axis, a first post end and a second post end, wherein the first post end is threaded for screw attachment to the lock screw wherein the lift off process comprises holding the Ti base against the swivel shell using the temporary fastener coupled to the lock screw while adhesively attaching the Ti base to the prosthesis.

12. A system for alignment and attachment of a dental prosthesis to a dental implant comprising:

a multi-unit implant abutment comprising:

an abutment base comprising a first end having a ball and a second end with a threaded post with a longitudinal axis, wherein the ball comprises an abutment drive interface, and wherein the threaded post is configured to screw into the dental implant to a predetermined torque for screw attachment to the dental implant; and a shell portion having an interior surface and an exterior surface, wherein the shell portion has a first end with an aperture and a second end with a lock screw, and wherein the ball is captured inside the shell portion with the threaded post of the abutment base extending through the aperture of the shell portion;

a Ti base, the Ti base comprising an aperture on a proximal end and an interface on a distal end configured to mount on an exterior of the shell portion against a seating interface of the shell portion; and at least one drive tool sized and configured to engage the abutment drive interface and/or the lock screw, wherein the at least one drive tool is sized and configured to be inserted through the aperture of the Ti base to engage the lock screw, and wherein the lock screw is configured to be rotatably moved to apply pressure on the ball to fix the shell portion in a desired orientation relative to the ball.

13. The system for alignment and attachment of a dental prosthesis to a dental implant of claim 12, wherein the Ti base is incorporated into the dental prosthesis, and wherein a force is applied to the dental prosthesis to align the multi-unit abutment with the Ti base when the lock screw is tightened while the dental prosthesis is coupled to the Ti base and the Ti base is positioned over the shell portion of the multi-unit implant abutment.

14. The system for alignment and attachment of a dental prosthesis to a dental implant of claim 12, further comprising a prosthetic screw, wherein the prosthetic screw comprises:

a head portion with a width larger than the Ti base aperture; and a threaded shaft portion with a width smaller than the Ti base aperture, wherein the lock screw includes threads for receiving the threaded shaft portion of the prosthetic screw.

15. The system for alignment and attachment of a dental prosthesis to a dental implant of claim 14, wherein the lock screw comprises a longitudinal aperture that comprises internal threads for engaging the threaded shaft portion of the prosthetic screw and a drive interface for receiving a tool of the at least one drive tool for tightening the lock screw.

16. The system for alignment and attachment of a dental prosthesis to a dental implant of claim 12, wherein the shell portion is provided as a unitary body and the abutment base with the ball and threaded post is provided as a unitary body with the ball captured in the shell portion.

17. The system for alignment and attachment of a dental prosthesis to a dental implant of claim 12, wherein the lock screw has a longitudinal aperture, and wherein the longitudinal aperture is sized to allow at least one tool to extend through to engage an abutment drive interface in the ball.

* * * * *

UNITED STATES PATENT AND TRADEMARK OFFICE
CERTIFICATE OF CORRECTION

PATENT NO. : 12,023,220 B2
APPLICATION NO. : 18/548553
DATED : July 2, 2024
INVENTOR(S) : Kofford et al.

It is certified that error appears in the above-identified patent and that said Letters Patent is hereby corrected as shown below:

In the Specification

Column 9, Line 46: Please correct "mean±10" to read --mean ± 10--

Signed and Sealed this
Third Day of September, 2024

Katherine Kelly Vidal
*Director of the United States Patent and Trademark Office*